(12) United States Patent
Clemens et al.

(10) Patent No.: US 8,326,706 B2
(45) Date of Patent: Dec. 4, 2012

(54) PROVIDING LOGISTICS EXECUTION APPLICATION AS ENTERPRISE SERVICES

(75) Inventors: Achim Clemens, Speyer (DE); Stefan Moeller, Dielheim (DE); Thomas Friedrich, Walldorf (DE); Yair Ben-Shaul, Hadera (IL); Jochen Hirth, Weinheim (DE); Wolfgang Barheine, Karlsruhe (DE); Achim Heger, Meckesheim (DE); Stephan Hetzer, Oestringen-Eichelberg (DE); Andreas Bettin, Bad Schoenborn (DE); Jochen Steinbach, Bad Schoenborn (DE); Reiner Bildmayer, Bad Schoenborn (DE); Jan Richert, Mannheim (DE); Sergio Rozenszajn, Rehovot (IL); Irena Kull, Yehud (IL); Shai Alfandary, Even Yehuda (IL); Nir Pachter, Moshav Gealia (IL); Yuval Morad, Zur Mashe (IL); Renzo Colle, Stutensee (DE); Nico Apfelbach, Dielheim (DE); Martin J. Wilmes, Oftersheim (DE); Sabine Deimel, Rauenberg (DE); Jens Freund, Heidelberg (DE); Frank Wagner, Neckarsteinach-Necharhausen (DE)

(73) Assignee: SAP AG, Walldorf (DE)

( * ) Notice: Subject to any disclaimer, the term of this patent is extended or adjusted under 35 U.S.C. 154(b) by 372 days.

(21) Appl. No.: 12/233,554

(22) Filed: Sep. 18, 2008

(65) Prior Publication Data
US 2010/0070318 A1    Mar. 18, 2010

(51) Int. Cl.
*G06Q 10/00* (2006.01)
*G06Q 20/00* (2006.01)
*G06F 19/00* (2011.01)

(52) U.S. Cl. ............................. 705/28; 705/22; 235/385
(58) Field of Classification Search ........................ None
See application file for complete search history.

(56) References Cited

U.S. PATENT DOCUMENTS

| | | | |
|---|---|---|---|
| 4,947,321 A | 8/1990 | Spence et al. |
| 5,550,734 A | 8/1996 | Tarter et al. |
| 5,560,005 A | 9/1996 | Hoover et al. |
| 5,586,312 A | 12/1996 | Johnson et al. |
| 5,632,022 A | 5/1997 | Warren et al. |
| 5,634,127 A | 5/1997 | Cloud et al. |
| 5,680,619 A | 10/1997 | Gudmundson et al. |
| 5,704,044 A | 12/1997 | Tarter et al. |
| 5,768,119 A | 6/1998 | Havekost et al. |
| 5,822,585 A | 10/1998 | Noble et al. |

(Continued)

FOREIGN PATENT DOCUMENTS
WO          00/23874          4/2000
(Continued)

OTHER PUBLICATIONS

Aleksy, M. et al.; "Interoperability of Java-Based Applications and SAP's Business Framework State of the Art and Desirable Developments"; Proceedings of the International Symposium on Edinburgh, UK; Sep. 1999; IEEE Computer Soc.; pp. 190-200.

(Continued)

*Primary Examiner* — Fahd A Obeid
(74) *Attorney, Agent, or Firm* — Fish & Richardson P.C.

(57) ABSTRACT

Methods and apparatus, including systems and computer program products, for a service architecture design that provides enterprise services having logistics execution functionality at the level of an enterprise application. The design includes a set of service operations, process components, and optionally deployment units. Suitable business objects are also described.

17 Claims, 25 Drawing Sheets

U.S. PATENT DOCUMENTS

| | | | |
|---|---|---|---|
| 5,832,218 A | 11/1998 | Gibbs et al. |
| 5,848,291 A | 12/1998 | Milne et al. |
| 5,867,495 A | 2/1999 | Elliott et al. |
| 5,881,230 A | 3/1999 | Christensen et al. |
| 5,893,106 A | 4/1999 | Brobst et al. |
| 5,918,219 A | 6/1999 | Isherwood |
| 5,987,247 A | 11/1999 | Lau |
| H001830 H | 1/2000 | Petrimoulx et al. |
| 6,028,997 A | 2/2000 | Leymann et al. |
| 6,049,838 A | 4/2000 | Miller et al. |
| 6,070,197 A | 5/2000 | Cobb et al. |
| 6,151,582 A | 11/2000 | Huang et al. |
| 6,167,563 A | 12/2000 | Fontana et al. |
| 6,167,564 A | 12/2000 | Fontana et al. |
| 6,177,932 B1 | 1/2001 | Galdes et al. |
| 6,182,133 B1 | 1/2001 | Horvitz |
| 6,208,345 B1 | 3/2001 | Sheard et al. |
| 6,272,672 B1 | 8/2001 | Conway |
| 6,311,170 B1 | 10/2001 | Embrey |
| 6,338,097 B1 | 1/2002 | Krenzke et al. |
| 6,424,991 B1 | 7/2002 | Gish |
| 6,434,740 B1 | 8/2002 | Monday et al. |
| 6,442,748 B1 | 8/2002 | Bowman-Amuah |
| 6,445,782 B1 | 9/2002 | Elfe et al. |
| 6,446,045 B1 | 9/2002 | Stone et al. |
| 6,446,092 B1 | 9/2002 | Sutter |
| 6,473,794 B1 | 10/2002 | Guheen et al. |
| 6,493,716 B1 | 12/2002 | Azagury et al. |
| 6,571,220 B1 | 5/2003 | Ogino et al. |
| 6,594,535 B1 | 7/2003 | Constanza |
| 6,601,233 B1 | 7/2003 | Underwood |
| 6,601,234 B1 | 7/2003 | Bowman-Amuah |
| 6,606,744 B1 | 8/2003 | Mikurak |
| 6,609,100 B2 | 8/2003 | Smith et al. |
| 6,671,673 B1 | 12/2003 | Baseman et al. |
| 6,678,882 B1 | 1/2004 | Hurley et al. |
| 6,687,734 B1 | 2/2004 | Sellink et al. |
| 6,691,151 B1 | 2/2004 | Cheyer et al. |
| 6,721,783 B1 | 4/2004 | Blossman et al. |
| 6,738,964 B1 | 5/2004 | Zink et al. |
| 6,747,679 B1 | 6/2004 | Finch et al. |
| 6,750,885 B1 | 6/2004 | Finch et al. |
| 6,764,009 B2 | 7/2004 | Melick et al. |
| 6,789,252 B1 | 9/2004 | Burke et al. |
| 6,847,854 B2 | 1/2005 | Discenzo |
| 6,859,931 B1 | 2/2005 | Cheyer et al. |
| 6,889,197 B2 | 5/2005 | Lidow |
| 6,889,375 B1 | 5/2005 | Chan et al. |
| 6,895,438 B1 | 5/2005 | Ulrich |
| 6,904,399 B2 | 6/2005 | Cooper et al. |
| 6,907,395 B1 | 6/2005 | Hunt et al. |
| 6,954,736 B2 | 10/2005 | Menninger et al. |
| 6,985,939 B2 | 1/2006 | Fletcher et al. |
| 6,990,466 B1 | 1/2006 | Hu |
| 7,003,474 B2 | 2/2006 | Lidow |
| 7,031,998 B2 | 4/2006 | Archbold |
| 7,043,448 B2 | 5/2006 | Campbell |
| 7,047,518 B2 | 5/2006 | Little et al. |
| 7,050,056 B2 | 5/2006 | Meyringer |
| 7,050,873 B1 | 5/2006 | Discenzo |
| 7,055,136 B2 | 5/2006 | Dzoba et al. |
| 7,058,587 B1 | 6/2006 | Horne |
| 7,069,536 B2 | 6/2006 | Yaung |
| 7,072,855 B1 | 7/2006 | Godlewski et al. |
| 7,076,766 B2 | 7/2006 | Wirts et al. |
| 7,117,447 B2 | 10/2006 | Cobb et al. |
| 7,120,597 B1 | 10/2006 | Knudtzon et al. |
| 7,120,896 B2 | 10/2006 | Budhiraja et al. |
| 7,131,069 B1 | 10/2006 | Rush et al. |
| 7,155,409 B1 | 12/2006 | Stroh |
| 7,181,694 B2 | 2/2007 | Reiss et al. |
| 7,184,964 B2 | 2/2007 | Wang |
| 7,194,431 B1 | 3/2007 | Land et al. |
| 7,197,740 B2 | 3/2007 | Beringer et al. |
| 7,200,569 B2 | 4/2007 | Gallagher et al. |
| 7,206,768 B1 | 4/2007 | deGroeve et al. |
| 7,216,091 B1 | 5/2007 | Blandina et al. |
| 7,219,107 B2 | 5/2007 | Beringer |
| 7,222,786 B2 | 5/2007 | Renz et al. |
| 7,225,240 B1 | 5/2007 | Fox et al. |
| 7,257,254 B2 | 8/2007 | Tunney |
| 7,283,973 B1 | 10/2007 | Loghmani et al. |
| 7,293,254 B2 | 11/2007 | Bloesch et al. |
| 7,299,970 B1 | 11/2007 | Ching |
| 7,315,830 B1 | 1/2008 | Wirtz et al. |
| 7,324,966 B2 | 1/2008 | Scheer |
| 7,353,180 B1 | 4/2008 | Silverstone et al. |
| 7,356,492 B2 | 4/2008 | Hazi et al. |
| 7,367,011 B2 | 4/2008 | Ramsey et al. |
| 7,370,315 B1 | 5/2008 | Lovell et al. |
| 7,376,601 B1 | 5/2008 | Aldridge |
| 7,376,604 B1 | 5/2008 | Butcher |
| 7,376,632 B1 | 5/2008 | Sadek et al. |
| 7,383,201 B2 | 6/2008 | Matsuzaki et al. |
| 7,386,833 B2 | 6/2008 | Granny et al. |
| 7,406,716 B2 | 7/2008 | Kanamori et al. |
| 7,415,697 B1 | 8/2008 | Houlding |
| 7,418,409 B1 | 8/2008 | Goel |
| 7,418,424 B2 | 8/2008 | Martin et al. |
| 7,448,022 B1 | 11/2008 | Ram et al. |
| 7,451,432 B2 | 11/2008 | Shukla et al. |
| 7,461,030 B2 | 12/2008 | Hibler et al. |
| 7,469,233 B2 | 12/2008 | Shooks et al. |
| 7,516,088 B2 | 4/2009 | Johnson et al. |
| 7,523,054 B2 | 4/2009 | Tyson-Quah |
| 7,529,699 B2 | 5/2009 | Fuse et al. |
| 7,536,325 B2 | 5/2009 | Randell et al. |
| 7,536,354 B1 | 5/2009 | deGroeve et al. |
| 7,546,520 B2 | 6/2009 | Davidson et al. |
| 7,546,575 B1 | 6/2009 | Dillman et al. |
| 7,565,640 B2 | 7/2009 | Shukla et al. |
| 7,624,371 B2 | 11/2009 | Kulkarni et al. |
| 7,631,291 B2 | 12/2009 | Shukla et al. |
| 7,640,195 B2 | 12/2009 | Von Zimmermann et al. |
| 7,640,291 B2 | 12/2009 | Maturana et al. |
| 7,657,406 B2 | 2/2010 | Tolone et al. |
| 7,657,445 B1 | 2/2010 | Goux |
| 7,665,083 B2 | 2/2010 | Demant et al. |
| 7,668,761 B2 | 2/2010 | Jenkins et al. |
| 7,672,888 B2 | 3/2010 | Allin et al. |
| 7,681,176 B2 | 3/2010 | Wills et al. |
| 7,693,586 B2 | 4/2010 | Dumas et al. |
| 7,703,073 B2 | 4/2010 | Illowsky et al. |
| 7,739,160 B1 | 6/2010 | Ryan et al. |
| 7,742,985 B1 | 6/2010 | Digrigoli et al. |
| 7,747,980 B2 | 6/2010 | Illowsky et al. |
| 7,765,156 B2 | 7/2010 | Staniar et al. |
| 7,765,521 B2 | 7/2010 | Bryant |
| 7,788,145 B2 | 8/2010 | Wadawadigi et al. |
| 7,797,698 B2 | 9/2010 | Diament et al. |
| 7,814,142 B2 | 10/2010 | Mamou et al. |
| 7,822,682 B2 | 10/2010 | Arnold et al. |
| 7,835,971 B2 | 11/2010 | Stockton et al. |
| 7,904,350 B2 | 3/2011 | Ayala et al. |
| 7,925,985 B2 | 4/2011 | Moore |
| 2002/0026394 A1 | 2/2002 | Savage et al. |
| 2002/0042756 A1 | 4/2002 | Kumar et al. |
| 2002/0049622 A1 | 4/2002 | Lettich et al. |
| 2002/0073114 A1 | 6/2002 | Nicastro et al. |
| 2002/0078046 A1 | 6/2002 | Uluakar et al. |
| 2002/0082892 A1 | 6/2002 | Raffel et al. |
| 2002/0103660 A1 | 8/2002 | Cramon et al. |
| 2002/0107826 A1 | 8/2002 | Ramachandran et al. |
| 2002/0120553 A1 | 8/2002 | Bowman-Amuah |
| 2002/0133368 A1 | 9/2002 | Strutt et al. |
| 2002/0138281 A1 | 9/2002 | Cirulli et al. |
| 2002/0138358 A1 | 9/2002 | Scheer |
| 2002/0143598 A1 | 10/2002 | Scheer |
| 2002/0156695 A1 | 10/2002 | Edwards |
| 2002/0161907 A1 | 10/2002 | Moon |
| 2002/0184111 A1 | 12/2002 | Swanson |
| 2002/0188486 A1 | 12/2002 | Gil et al. |
| 2002/0198798 A1 | 12/2002 | Ludwig et al. |
| 2002/0198828 A1 | 12/2002 | Ludwig et al. |
| 2003/0009754 A1 | 1/2003 | Rowley et al. |
| 2003/0069774 A1 | 4/2003 | Hoffman et al. |
| 2003/0074271 A1 | 4/2003 | Viswanath et al. |

| | | |
|---|---|---|
| 2003/0074360 A1 | 4/2003 | Chen et al. |
| 2003/0083762 A1 | 5/2003 | Farrah et al. |
| 2003/0084127 A1 | 5/2003 | Budhiraja et al. |
| 2003/0130860 A1 | 7/2003 | Datta et al. |
| 2003/0182206 A1 | 9/2003 | Hendrix et al. |
| 2003/0212602 A1 | 11/2003 | Schaller |
| 2003/0233290 A1 | 12/2003 | Yang et al. |
| 2004/0015367 A1 | 1/2004 | Nicastro et al. |
| 2004/0034578 A1 | 2/2004 | Oney et al. |
| 2004/0111304 A1 | 6/2004 | Meka et al. |
| 2004/0128180 A1 | 7/2004 | Abel et al. |
| 2004/0153359 A1 | 8/2004 | Ho et al. |
| 2004/0158506 A1 | 8/2004 | Wille |
| 2004/0172510 A1 | 9/2004 | Nagashima et al. |
| 2004/0181470 A1 | 9/2004 | Grounds |
| 2004/0205011 A1 | 10/2004 | Northington et al. |
| 2004/0236639 A1 | 11/2004 | Candadai et al. |
| 2004/0236687 A1 | 11/2004 | Tyson-Quah |
| 2004/0243489 A1 | 12/2004 | Mitchell et al. |
| 2004/0254866 A1 | 12/2004 | Crumbach et al. |
| 2004/0255152 A1 | 12/2004 | Kanamori et al. |
| 2005/0010501 A1 | 1/2005 | Ward |
| 2005/0033588 A1 | 2/2005 | Ruiz et al. |
| 2005/0044015 A1 | 2/2005 | Bracken et al. |
| 2005/0060235 A2 | 3/2005 | Byrne |
| 2005/0060408 A1 | 3/2005 | McIntyre et al. |
| 2005/0065828 A1 | 3/2005 | Kroswek et al. |
| 2005/0108680 A1 | 5/2005 | Cheng et al. |
| 2005/0113092 A1 | 5/2005 | Coppinger et al. |
| 2005/0114829 A1 | 5/2005 | Robin et al. |
| 2005/0125310 A1 | 6/2005 | Hazi et al. |
| 2005/0144125 A1 | 6/2005 | Erbey et al. |
| 2005/0144226 A1 | 6/2005 | Purewal |
| 2005/0160104 A1 | 7/2005 | Meera et al. |
| 2005/0165784 A1 | 7/2005 | Gomez et al. |
| 2005/0177435 A1 | 8/2005 | Lidow |
| 2005/0203760 A1 | 9/2005 | Gottumukkala et al. |
| 2005/0203813 A1 | 9/2005 | Welter et al. |
| 2005/0209732 A1 | 9/2005 | Audimoolam et al. |
| 2005/0209943 A1 | 9/2005 | Ballow et al. |
| 2005/0216325 A1 | 9/2005 | Ziad et al. |
| 2005/0222896 A1 | 10/2005 | Rhyne et al. |
| 2005/0235020 A1 | 10/2005 | Gabelmann et al. |
| 2005/0240592 A1 | 10/2005 | Mamou et al. |
| 2005/0246250 A1 | 11/2005 | Murray |
| 2005/0246482 A1 | 11/2005 | Gabelmann et al. |
| 2005/0256775 A1 | 11/2005 | Schapler et al. |
| 2005/0256882 A1 | 11/2005 | Able et al. |
| 2005/0257125 A1 | 11/2005 | Roesner et al. |
| 2005/0262192 A1 | 11/2005 | Mamou et al. |
| 2005/0284934 A1 | 12/2005 | Ernesti et al. |
| 2005/0288987 A1 | 12/2005 | Sattler et al. |
| 2005/0289020 A1 | 12/2005 | Bruns et al. |
| 2005/0289079 A1 | 12/2005 | Krishan et al. |
| 2006/0004802 A1 | 1/2006 | Phillips et al. |
| 2006/0053063 A1 | 3/2006 | Nagar |
| 2006/0064344 A1 | 3/2006 | Lidow |
| 2006/0074704 A1 | 4/2006 | Shukla et al. |
| 2006/0074731 A1 | 4/2006 | Green et al. |
| 2006/0080338 A1 | 4/2006 | Seubert et al. |
| 2006/0085243 A1 | 4/2006 | Cooper et al. |
| 2006/0085294 A1 | 4/2006 | Boerner et al. |
| 2006/0085336 A1 | 4/2006 | Seubert et al. |
| 2006/0089886 A1 | 4/2006 | Wong |
| 2006/0095439 A1 | 5/2006 | Buchmann et al. |
| 2006/0129978 A1 | 6/2006 | Abrari et al. |
| 2006/0143029 A1 | 6/2006 | Akbay et al. |
| 2006/0206352 A1 | 9/2006 | Pulianda |
| 2006/0248504 A1 | 11/2006 | Hughes |
| 2006/0274720 A1 | 12/2006 | Adams et al. |
| 2006/0287939 A1 | 12/2006 | Harel et al. |
| 2006/0288350 A1 | 12/2006 | Grigorovitch et al. |
| 2007/0011650 A1 | 1/2007 | Hage et al. |
| 2007/0075916 A1 | 4/2007 | Bump et al. |
| 2007/0094098 A1 | 4/2007 | Mayer et al. |
| 2007/0094261 A1 | 4/2007 | Phelan et al. |
| 2007/0129964 A1 | 6/2007 | Helmolt et al. |
| 2007/0129984 A1 | 6/2007 | von Helmolt et al. |
| 2007/0129985 A1 | 6/2007 | Helmolt et al. |
| 2007/0150332 A1 | 6/2007 | Grichnik et al. |
| 2007/0150387 A1 | 6/2007 | Seubert et al. |
| 2007/0150855 A1 | 6/2007 | Jeong |
| 2007/0156430 A1* | 7/2007 | Kaetker et al. ............. 705/1 |
| 2007/0156475 A1 | 7/2007 | Berger et al. |
| 2007/0156476 A1* | 7/2007 | Koegler et al. ............. 705/7 |
| 2007/0156482 A1 | 7/2007 | Bagheri |
| 2007/0156489 A1 | 7/2007 | Berger et al. |
| 2007/0156493 A1 | 7/2007 | Tebbe et al. |
| 2007/0156499 A1 | 7/2007 | Berger et al. |
| 2007/0156500 A1 | 7/2007 | Merkel et al. |
| 2007/0156538 A1 | 7/2007 | Peter et al. |
| 2007/0156550 A1 | 7/2007 | Der Emde et al. |
| 2007/0156731 A1 | 7/2007 | Ben-Zeev |
| 2007/0162893 A1 | 7/2007 | Kaetker et al. |
| 2007/0168303 A1* | 7/2007 | Moosmann et al. ......... 705/400 |
| 2007/0174068 A1 | 7/2007 | Alfandary et al. |
| 2007/0174145 A1 | 7/2007 | Hetzer et al. |
| 2007/0174811 A1 | 7/2007 | Kaetker et al. |
| 2007/0186209 A1 | 8/2007 | Kaetker et al. |
| 2007/0197877 A1 | 8/2007 | Decorte et al. |
| 2007/0198391 A1 | 8/2007 | Dreyer et al. |
| 2007/0214065 A1 | 9/2007 | Kahlon et al. |
| 2007/0220046 A1 | 9/2007 | Kaetker et al. |
| 2007/0233541 A1 | 10/2007 | Schorr et al. |
| 2007/0233575 A1 | 10/2007 | Berger et al. |
| 2007/0234282 A1 | 10/2007 | Prigge et al. |
| 2007/0239508 A1 | 10/2007 | Fazal et al. |
| 2007/0239569 A1 | 10/2007 | Lucas et al. |
| 2007/0265862 A1 | 11/2007 | Freund et al. |
| 2008/0004929 A9 | 1/2008 | Raffel et al. |
| 2008/0017722 A1 | 1/2008 | Snyder et al. |
| 2008/0027831 A1 | 1/2008 | Gerhardt |
| 2008/0065437 A1 | 3/2008 | Dybvig |
| 2008/0120129 A1 | 5/2008 | Seubert et al. |
| 2008/0147507 A1 | 6/2008 | Langhammer |
| 2008/0162382 A1 | 7/2008 | Clayton et al. |
| 2008/0208707 A1 | 8/2008 | Erbey et al. |
| 2008/0215354 A1 | 9/2008 | Halverson et al. |
| 2009/0037287 A1 | 2/2009 | Baitalmal et al. |
| 2009/0037492 A1 | 2/2009 | Baitalmal et al. |
| 2009/0189743 A1 | 7/2009 | Abraham et al. |
| 2009/0192858 A1 | 7/2009 | Johnson |

FOREIGN PATENT DOCUMENTS

| | | |
|---|---|---|
| WO | WO 2004/083984 | 9/2004 |
| WO | WO 2005/114381 | 12/2005 |

OTHER PUBLICATIONS

Anon,; "Sequenst Corp Bell Atlantic: Bell Atlantic Selects Sequent for Video-on-Demand Program; Sequent Moves to Sieze Opportunity in New Market"; Business Wire; Dec. 6, 1994.

Anon.; "State of the Art Reports™ 13,000 MAS 90® for Windows® Shipments in First Nine Months of Availability"; PR Newswire; Apr. 28, 1997.

Arch-int, S. et al.; "Development of Industrial Information Systems on the Web Using Busienss Components"; Computers in Industry; vol. 60; 2003; pp. 231-250.

Astudillo, H.; "How Conceptual System Architecture Leads to Business Process"; ACM; 2000; pp. 35-36.

Avanquest's Bookkeeper 2007 Provides All-in-One Solution for Small Business Accounting and Financial Management; New Version of Popular Software Enables Detailed Report Creation and In-House Payroll Processing; PR Newswire; New York; Oct. 3, 2006.

Avery, S.; "Buyer's Guide to Software for Purchasing 2000.(Directory)"; Purchasing, vol. 129, No. 1; p. 179; Jul. 13, 2000.

Beisiegel, M. et al.; "Service Component Architecture: Building Systems Using a Service Oriented Architecture"; Whitepaper [online]; Nov. 2005; pp. 1-31; http://download.boulder.ibm.com/ibmdl/pub/software/dw/specs/ws-sca/SCA_White_Paper1_09.pdf.

Cowan, D.D. et al.; "Application Integration: Constructing Composite Applications from Interactive Components"; Software Practice and Experience; vol. 23, No. 3; Mar. 1993; pp. 255-275.

Deimel, A.; "The SAP R/3 Business Framework"; Software—Concepts & Tools; vol. 19, No. 1; 1998; pp. 29-36.

Fellner, K.J., et al.; "Classification Framework for Business Components"; System Sciences; Proceedings of the 33rd Annual Hawaii International Conference; Jan. 2000; pp. 3239-3248.

Ferguson D.F. et al.; "Service-Oriented Architecture: Programming Model and Product Architecture"; IBM Systems Journal [online]; vol. 44, No. 4; Dec. 1, 2005; pp. 753-780; http://researchweb.watson.ibm.com/journal/sj/444/ferguson.pdf.

Gauthier, P. and OSS-J Architecture Board; "OSS through Java (TM) J2EE Design Guidelines"; [online]; Oct. 31, 2001; http://www.ossj.org/downloads/design_guidelines.shtml.

Gessford, J.E.; "Object-Oriented System Design"; Emerging Information Technologies for Competitive Advantage and Economic Development; Proceedings of the 1992 Information Resources Management Association International Conference; 1992; pp. 110-118.

He, J. et al.; "Component-Based Software Engineering: The Need to Link Methods and Their Theories"; Theoretical Aspects of Computer ICTAC 2005; Second International Colloquium Proceedings (Lecture notes in Computer Science vol. 3722); Oct. 2005; pp. 70-95.

"Hudson's Bay Company Realizes Fast ROI with the Oracle E-Business Suite"; PR Newswire; New York; Jan. 15, 2002; p. 1.

Kozacynski, W.; "Architecture Framework for Business Components"; Software Reuse 1998 Proceedings; Fifth International Conferences on Victoria, BC, Canada; Jun. 1998; IEEE Comput. Soc; pp. 300-307.

Kythe, D.K.; "The Promise of Distributed Business Components"; Bell Labs Technical Journal; vol. 75, No. 2; Mar./Apr. 1999; pp. 20-28.

Linthicum, D.S.; "Chapter 9: RPCs, Messaging, and B2B Application Integration"; B2B Application Integration: E-Business Enable Your Enterprise; 2001; pp. 167-181.

Nori A.K. et al.; "Composite Applications: Process Based Application Development"; Lecture Notes in Computer Science; vol. 2444; Aug. 2003; pp. 48-53.

Pilhofer, F.; "Writing and Using CORBA Components"; Apr. 2002; http://www.fpx.de/MicoCCM/download/mico-ccm.pdf; 17 pages.

Ravichandran, T.; "Special Issue on Component-Based Software Development"; The Data Base for Advances in Information Systems; 2003; pp. 45-46.

SAP AG; "Designing Cross Solutions"; SAP XAPPS, [online]; Sep. 2003; pp. 1-2; http://www.sap.com/belux/platform/netweaver/pdf/BWP_CAF.pdf.

Schmid, H.A.; "Business Entity Components and Buisness Process Components"; Joop; vol. 12, No. 6; Oct. 1999; pp. 6-10, 12-15.

Sharifi, M. et al.; "CORBA Components Collocation Optimization Enhanced with Local ORB-Like Services Support"; On the Move to Meaningful Internet Systems (2004): COOPIS, ODA and ODBASE. OTM Confederated Conferences COOPIS, DOA and ODBASE 2004; Proceedings Part II (Lecture Notes in Computer Science vol. 3291); 2004; pp. 1143-1154.

Singh, I. et al.; "Designing Enterprise Applications with the J2EE Platform, Second Edition"; Jun. 15, 2002.

Stojanovic, Z. et al.; "Modeling and Design of Service-Oriented Architecture"; Systems, Man and Cybernetics; 2004 IEEE International Conference on The Hague, The Netherlands; Oct. 2004; IEEE, vol. 5; pp. 4147-4152.

Thomas, A.; "Enterprise JavaBeans Server Component Model for Java"; [online]; Dec. 1997; http://www.cs.indiana.edu/classes/b649-gann/ejb-white-paper.pdf.

Vergil Technology Ltd.; "Vergil Composite Application Builder Suite"; Product Datasheet [online]; 2003; pp. 1-5; http://www.webservicesmall.com.docs/VCAB_datasheet.pdf.

Woods, D.; "Packaged Composite Applications: A Liberating Force for the User Interface"; Internet Citation [online]; Oct. 2004; 4 pages; http://www.sapdesignguild.org/editions/edition7/print_composite_applications.asp.

International Search Report and Written Opinion of the International Searching Authority issued in International Application No. PCT/EP2006/012625; Apr. 3, 2007; 8 pages.

International Preliminary Report on Patentability issued in International Application No. PCT/EP2006/012625; Jul. 1, 2008; 7 pages.

International Search Report and Written Opinion of the International Searching Authority issued in International Application No. PCT/EP2006/012614; Mar. 16, 2007; 7 pages.

International Preliminary Report on Patentability issued in International Application No. PCT/US2006/012614; Jul. 1, 2008; 6 pages.

International Search Report and Written Opinion of the International Searching Authority issued in International Application No. PCT/EP2006/012618; Apr. 3, 2007; 8 pages.

International Preliminary Report on Patentability issued in International Application No. PCT/EP2006/012618; Jul. 1, 2008; 7 pages.

International Search Report and Written Opinion of the International Searching Authority issued in International Application No. PCT/EP2006/012613; May 3, 2007; 6 pages.

International Preliminary Report on Patentability issued in International Application No. PCT/EP2006/012613; Jul. 1, 2008; 6 pages.

International Search Report and Written Opinion of the International Searching Authority issued in International Application No. PCT/EP2006/012624; Mar. 30, 2007; 9 pages.

International Preliminary Report on Patentability issued in International Application No. PCT/EP2006/012624; Jul. 1, 2008; 8 pages.

International Search Report and Written Opinion of the International Searching Authority issued in International Application No. PCT/EP2006/012623; May 7, 2007; 8 pages.

International Preliminary Report on Patentability issued in International Application No. PCT/EP2006/012623; Jul. 1, 2008; 7 pages.

International Search Report and Written Opinion of the International Searching Authority issued in International Application No. PCT/EP2006/012620; Mar. 21, 2007; 7 pages.

International Preliminary Report on Patentability issued in International Application No. PCT/EP2006/012620; Jul. 1, 2008; 6 pages.

International Search Report and Written Opinion of the International Searching Authority issued in International Application No. PCT/EP2006/012619; Apr. 19, 2007; 8 pages.

International Preliminary Report on Patentability issued in International Application No. PCT/EP2006/012619; Jul. 1, 2008; 7 pages.

International Search Report and Written Opinion of the International Searching Authority issued in International Application No. PCT/EP2006/012621; Apr. 19, 2007; 8 pages.

International Preliminary Report on Patentability issued in International Application No. PCT/EP2006/012621; Jul. 1, 2008; 7 pages.

International Search Report and Written Opinion of the International Searching Authority issued in International Application No. PCT/EP2007/002835; Aug. 9, 2007; 12 pages.

International Preliminary Report on Patentability issued in International Application No. PCT/EP2007/002835; Sep. 30, 2008; 8 pages.

Communication Pursuant to Article 94(3) EPC issued in European Application No. 06841224.6; May 15, 2009; 8 pages.

Communication Pursuant to Article 94(3) EPC issued in European Application No. 06847009.5; May 15, 2009; 10 pages.

Communication Pursuant to Article 94(3) EPC issued in European Application No. 07007130.3; Dec. 5, 2008; 6 pages.

Extended European Search Report issued in European Application No. 07007130.3; Oct. 5, 2007; 6 pages.

Office Action issued in U.S. Appl. No. 11/323,041; Apr. 30, 2009; 26 pages.

Office Action issued in U.S. Appl. No. 11/322,612; May 11, 2009; 24 pages.

Office Action issued in U.S. Appl. No. 11/322,772; Mar. 25, 2009; 12 pages.

Office Action issued in U.S. Appl. No. 11/323,590; Jan. 9, 2009; 23 pages.

Office Action issued in U.S. Appl. No. 11/396,288; Jan. 2, 2009; 18 pages.

Office Action issued in U.S. Appl. No. 11/396,288; Apr. 15, 2008; 26 pages.

Office Action issued in U.S. Appl. No. 11/397,029; Jul. 21, 2009; 28 pages.

Office Action issued in U.S. Appl. No. 11/323,040; Jul. 24, 2009; 35 pages.

Office Action issued in U.S. Appl. No. 11/323,590; Jul. 10, 2009; 32 pages.

Office Action issued in U.S. Appl. No. 11/322,816; Jul. 23, 2006; 41 pages.

Office Action issued in U.S. Appl. No. 11/322,851; Sep. 2, 2009; 32 pages.

Office Action issued in U.S. Appl. No. 11/323,590; Dec. 30, 2009; 31 pages.
Office Action issued in U.S. Appl. No. 11/322,482; Jan. 7, 2010; 19 pages.
Office Action issued in U.S. Appl. No. 11/322,772; Dec. 9, 2009; 14 pages.
Office Action issued in U.S. Appl. No. 11/323,039; Sep. 4, 2009; 36 pages.
Office Action issued in U.S. Appl. No. 11/323,634; Sep. 10, 2009; 15 pages.
Office Action issued in U.S. Appl. No. 11/322,383; Nov. 12, 2009; 29 pages.
Office Action issued in U.S. Appl. No. 11/396,258; Nov. 25, 2009; 9 pages.
Office Action issued in U.S. Appl. No. 12/333,085; Jun. 25, 2009; 9 pages.
Office Action issued in U.S. Appl. No. 11/396,288; Aug. 19, 2009; 20 pages.
"American Software Announces ASP Pricing Model for It's a-Applications Expense Business Solution"; PR Newswire; Mar. 6, 2000; 2 pages.
Bastani et al.; "Complex Open System Design by Quasi Agents: Process Oriented Modeling in Agent Based Systems"; ACM SIGSOFT; vol. 34, No. 4; 2009; pp. 1-14.
Bastani et al.; "Process Oriented Abstraction of the Complex Evolvable Systems: Problem Model Construction"; ACM SIGSOFT; vol. 33, No. 3; 2008; pp. 1-13.
"Cendant Announces Comprehensive Online Travel Booking to Meet President Bush's eTravel Initiative"; PR Newswire; Jul. 9, 2002; 3 pages.
Chen, M. and Meixell, M.; "Web Services Enabled Procurement in the Extended Enterprise: An Architectural Design and Implementation"; Journal of Electronic Commerce Research, vol. 4, No. 4; 2003; pp. 140-155.
Duc et al.; "Uniform Object Modeling Methodology and Reuse of Real Time System Using UML"; EMSOFT '05; Sep. 19-22, 2005; pp. 44-47.
Gomaa et al.; "Model Based Software Design and Adaption"; International Workshop on Software Engineering for Adaptive and Self-Managing Systems (SEAMS '07); IEEE; 2007; 10 pages.
Huang, S. et al.; "Computer-Assisted Supply Chain Configuration Based on Supply Chain Operations Reference (SCOR) Model"; Computers & Industrial Engineering 48; 2005; pp. 377-394.
Intuit Canada Ltd.; "Startup Guide—QuickBooks Basic for Windows, QuickBooks Pro for Windows, QuickBooks Premier for Windows"; 2002; 230 pages.
Lambert et al.; "Supply Chain Metrics"; International Journal of Logistics Management; vol. 12, No. 1; 2001; pp. 1-19.
Lockamy III, et al.; "Linking SCOR Planning Practices to Supply Chain Performance"; International Journal of Operationgs & Production Management; vol. 24, No. 12; pp. 1192-1218.
mySAP™ ERP 2005; Downloaded Mar. 24, 2010 from <http://web.archive.org/web/20061104021205/www.sap.com/solutions/business-suite/erp/pdf/BWP_mySAP_ERP_2005.pdf>; 60 pages.
"Oracle Expands E-Commerce Offerings with the Acquisition of E-Travel, Inc."; PR Newswire; Mar. 9, 1999; 3 pages.
Ouyang et al.; "From Business Process Models to Process Oriented Software Systems"; ACM Transactions on Software Engineering and Methodology; vol. 19, No. 1, Article 2; Aug. 2009; pp. 1-37.
Rossi et al.; "Designing and Architecturing Process-aware Web Applications with EPML"; SAC '08; Mar. 16-20, 2008; pp. 2409-2414.
"SAP Delivers Next-generation ERP to Customers"; PR Newswire; New York; Mar. 10, 2005; 7 pages.
Schultz, G.J.; "Keeping SCOR on Your Supply Chain: Basic Operations Reference Model Updates with the Times"; Information Strategy: The Executive's Journal; Summer 2003; pp. 12-20.
Stephens, S.; "Supply Chain Council & Supply Chain Operations Reference (SCOR) Model Overview"; <http://www.supply-chain.org>; Version 5.0a; Aug. 2001; 29 pages.

Stephens, S.; "Supply Chain Operatives Reference Model Version 5.0: A New Tool to Improve Supply Chain Efficiency and Achieve Best Practice"; Information Systems Frontiers 3:4, 2001; pp. 471-476.
"Time Management with mySAPTM ERP Human Capital Management"; Downloaded Mar. 24, 2010 from <http://web.archive.org/web/20060105084834/www.sap.com/solutions/business-suite/erp/hcm/pdf/HCM_Time_Management.pdf>; 4 pages.
Vogel et al.; "mySAP ERP for Dummies"; Published on Sep. 30, 2005; Downloaded on Mar. 23, 2001 from <http://proquest.safaribooksonline.com/9780764599958> 41 pages.
International Search Report and Written Opinion of the International Searching Authority issued in International Application No. PCT/EP2007/002841; Aug. 16, 2007; 12 pages.
International Preliminary Report on Patentability under Chapter I issued in International Application No. PCT/EP2007/002841; Sep. 30, 2008; 8 pages.
Office Action issued in U.S. Appl. No. 11/396,312 on Mar. 30, 2010; 23 pages.
Office Action issued in U.S. Appl. No. 11/322,611 on Mar. 31, 2010; 17 pages.
Notice of Allowance issued in U.S. Appl. No. 11/322,610 on Mar. 1, 2010; 12 pages.
Notice of Allowance issued in U.S. Appl. No. 11/322,610 on Jun. 14, 2010; 6 pages.
Office Action issued in U.S. Appl. No. 11/322,772; Jul. 12, 2010; 18 pages.
Office Action issued in U.S. Appl. No. 11/322,398 on Apr. 2, 2010; 39 pages.
Notice of Allowance issued in U.S. Appl. No. 11/322,398 on Jul. 23, 2010; 38 pages.
Office Action issued in U.S. Appl. No. 11/322,383; May 12, 2010; 23 pages.
Office Action issued in U.S. Appl. No. 11/322,382 on Mar. 29, 2010; 28 pages.
Office Action issued in U.S. Appl. No. 11/323,041 on Mar. 19, 2010; 26 pages.
Advisory Action issued in U.S. Appl. No. 11/323,041 on Jun. 7, 2010; 3 pages.
Notice of Allowance issued in U.S. Appl. No. 11/396,259 on Mar. 29, 2010; 19 pages.
Notice of Allowance issued in U.S. Appl. No. 11/396,259 on Jul. 6, 2010; 6 pages.
Notice of Allowance issued in U.S. Appl. No. 11/396,288; May 20, 2010; 15 pages.
Notice of Allowance issued in U.S. Appl. No. 11/396,258 on Mar. 31, 2010; 9 pages.
Supplemental Notice of Allowance issued in U.S. Appl. No. 11/396,258 on May 19, 2010; 8 pages.
Notice of Allowance issued in U.S. Appl. No. 11/396,258 on Jul. 28, 2010; 9 pages.
Office Action issued in U.S. Appl. No. 11/396,236 on Mar. 31, 2010; 20 pages.
Office Action issued in U.S. Appl. No. 11/323,039; Apr. 14, 2010; 15 pages.
Office Action issued in U.S. Appl. No. 11/322,851; May 12, 2010; 15 pages.
Office Action issued in U.S. Appl. No. 11/322,845; Jul. 15, 2010; 16 pages.
Office Action issued in U.S. Appl. No. 11/323,040; Apr. 29, 2010; 17 pages.
Office Action issued in U.S. Appl. No. 11/322,612; Apr. 1, 2010; 23 pages.
Advisory Action issued in U.S. Appl. No. 11/322,612; Jun. 24, 2010; 3 pages.
Notice of Allowance issued in U.S. Appl. No. 11/397,026 on Mar. 29, 2010; 17 pages.
Supplemental Notice of Allowance issued in U.S. Appl. No. 11/397,026 on Jul. 9, 2010; 4 pages.
Notice of Allowance issued in U.S. Appl. No. 11/397,026 on Jul. 26, 2010; 6 pages.
Notice of Allowance issued in U.S. Appl. No. 12/233,534 on Jun. 24, 2010; 15 pages.

Notice of Allowance issued in U.S. Appl. No. 12/327,354 on Jun. 25, 2010; 16 pages.
Notice of Allowance issued in U.S. Appl. No. 11/967,865 on Mar. 31, 2010; 16 pages.
Notice of Allowance issued in U.S. Appl. No. 11/322,482; Jul. 13, 2010; 5 pages.
Office Action issued in U.S. Appl. No. 11/323,590; Jun. 21, 2010; 25 pages.
Office Action issued in U.S. Appl. No. 11/323,634; Apr. 2, 2010; 9 pages.
Office Action issued in U.S. Appl. No. 11/322,816; Apr. 15, 2010; 27 pages.
Office Action issued in U.S. Appl. No. 11/396,327 on Apr. 1, 2010; 26 pages.
Office Action issued in U.S. Appl. No. 12/333,085; Mar. 23, 2010; 5 pages.
Cascallar, Eduardo et al.; "Assessment in the Evaluation of Self-Regulation as a Process"; Educational Psychology Review; vol. 18, No. 3; Sep. 2006; pp. 297-306.
Cool, David W.; "Activity Fund Accounting"; School Business Affairs; vol. 49, No. 6; Jun. 1983; pp. 50-52.
SAP AG; "SAP NetWeaver Visual Composer: User Guide (SAP NetWeaver Visual Composer release 6.0)"; Document version 1.1; pp. 1-208.
Strelich, Thomas P. et al.; "Simulation-Based Transformation with the Service Integration/Interoperation Infrastructure"; Technology Review Journal; Fall/Winter 2005; pp. 99-115.
Office Action issued in U.S. Appl. No. 11/396,312 on Sep. 10, 2010; 23 pages.
Office Action issued in U.S. Appl. No. 11/322,611 on Sep. 16, 2010; 21 pages.
Notice of Allowance issued in U.S. Appl. No. 11/322,610 on Sep. 23, 2010; 6 pages.
Notice of Allowance issued in U.S. Appl. No. 11/322,398 on Oct. 29, 2010; 18 pages.
Notice of Allowanced issued in U.S. Appl. No. 11/322,398 on Nov. 15, 2010; 20 pages.
Notice of Allowance issued in U.S. Appl. No. 1/322,382 on Sep. 20, 2010; 6 pages.
Notice of Allowance issued in U.S. Appl. No. 11/396,259 on Oct. 15, 2010; 6 pages.
Notice of Allowance issued in U.S. Appl. No. 11/396,288; Sep. 24, 2010; 4 pages.
Office Action issued in U.S. Appl. No. 11/396,250 on Oct. 18, 2010; 15 pages.
Notice of Allowance issued in U.S. Appl. No. 11/396,258 on Nov. 16, 2010; 8 pages.
Office Action issued in U.S. Appl. No. 11/396,236 on Oct. 28, 2010; 19 pages.
Office Action issued in U.S. Appl. No. 11/323,040 on Nov. 5, 2010; 33 pages.
Notice of Allowance issued in U.S. Appl. No. 11/397,026 on Nov. 15, 2010; 7 pages.
Notice of Allowance issued in U.S. Appl. No. 11/968,054 on Sep. 7, 2010; 11 pages.
Office Action issued in U.S. Appl. No. 12/233,557 on Sep. 16, 2010; 16 pages.
Notice of Allowance issued in U.S. Appl. No. 12/233,534 on Oct. 20, 2010; 15 pages.
Notice of Allowance issued in U.S. Appl. No. 12/327,354 on Oct. 18, 2010; 16 pages.
Notice of Allowance issued in U.S. Appl. No. 11/967,865 on Oct. 6, 2010; 6 pages.
Office Action issued in U.S. Appl. No. 11/322,973 on Dec. 7, 2010; 13 pages.
Office Action issued in U.S. Appl. No. 11/404,147 on Nov. 24, 2010; 27 pages.
Office Action issued in U.S. Appl. No. 11/967,483; Aug. 20, 2010; 10 pages.
Notice of Allowance issued in U.S. Appl. No. 12/333,085; Sep. 13, 2010; 8 pages.
Bin et al.; "Component Model Optimization for Distributed Real-Time Embedded Software"; IEEE International Conference on Systems, Man and Cybernetics; Oct. 13, 2004; 6 pages.
Cohen; "Optimizer: IBM's Multi-Echelon Inventory System for Managing Service Logistics Interfaces"; vol. 20, No. 1; 1990; pp. 65-82.
Cohen et al.; "Saturn's Supply-Chain Innovation: High Value in After Sales Service"; Sloan Management Review; vol. 41, No. 4; 2000; pp. 93-101.
Cox et al.; "A Formal Model for Component Based Software"; IEEE; Aug. 7, 2002; 8 pages.
Ferscha et al.; "A Light-Weight Component Model for Peer-to-Peer Applications"; IEEE; Mar. 23, 2004.
Flissi et al.; "A Component-based Software Infrastructure for Ubiquitous Computing"; IEEE; Jul. 4, 2005.
Gould; "Integrating the Manufacturing Enterprise"; Automative Design & Production; 119, 1; ABI/INFORM Global; Jan. 2007; 3 pages.
Huang et al.; "Supply Chain Configuration Based on Supply Chain Operations Reference (SCOR) Model"; Computers and Industrial Engineering; Elsevier; 2005.
Kalakota et al.; "Readings in Electronic Commerce"; Addison-Wesley Longman, Inc.; 1995; ISBN: 0-201-88060-1.
Orsburn; "Spares Management Handbook"; McGrawHill; 1991; ISBN: 0-8306-7626-0.
Papazoglou et al; "Service-Oriented Computing Research Road Map"; http://infolab.uvt.nl/pub/papazogloump-2006-96.pdf; Mar. 1, 2006; 29 pages.
SAP AG; "Powered by SAP NetWeaver Partner Program—Frequently Asked Questions"; May 2005; 10 pages [online] http://www.lionbridge.com/NR/rdonlyres/4940BE1F/DA46/412E/AB16/F049BD865CA1/0/PBMWFAQ_50070686_en.pdf.
Office Action issued in U.S. Appl. No. 12/233,550 on Jan. 12, 2011; 29 pages.
Notice of Allowance issued in U.S. Appl. No. 12/233,550 on May 11, 2011; 20 pages.
Office Action issued in U.S. Appl. No. 11/323,634 on Apr. 29, 2011; 8 pages.
Notice of Allowance issued in U.S. Appl. No. 11/396,327 on Nov. 30, 2010; 28 pages.
Notice of Allowance issued in U.S. Appl. No. 12/233,462 on Feb. 2, 2011; 11 pages.
Office Action issued in U.S. Appl. No. 11/967, 483 on Mar. 4, 2011; 6 pages.
Notice of Allowance issued in U.S. Appl. No. 12/233,534 on Jan. 31, 2011; 15 pages.
Notice of Allowance issued in U.S. Appl. No. 1/322,382 on Jan. 6, 2011; 7 pages.
Notice of Allowance issued in U.S. Appl. No. 11/322,610 on Dec. 22, 2010; 6 pages.
Notice of Allowance issued in U.S. Appl. No. 11/322,610 on Mar. 31, 2011; 6 pages.
Notice of Allowance issued in U.S. Appl. No. 11/396,259 on Jan. 20, 2011; 6 pages.
Notice of Allowance issued in U.S. Appl. No. 11/396,288; Dec. 28, 2010; 4 pages.
Notice of Allowance issued in U.S. Appl. No. 11/396,250 on Mar. 2, 2011; 13 pages.
Notice of Allowance issued in U.S. Appl. No. 11/322,845; Dec. 27, 2010; 16 pages.
Notice of Allowance issued in U.S. Appl. No. 11/322,845; Apr. 8, 2011; 8 pages.
Notice of Allowance issued in U.S. Appl. No. 11/397,026 on Mar. 3, 2011; 6 pages.
Office Action issued in U.S. Appl. No. 12/233,417 on Apr. 7, 2011; 32 pages.
Office Action issued in U.S. Appl. No. 12/233,530 on Apr. 29, 2011; 11 pages.
Office Action issued in U.S. Appl. No. 11/967,405 on Apr. 27, 2011; 15 pages.
Office Action issued in U.S. Appl. No. 12/233,557 on Mar. 4, 2011; 19 pages.

Office Action issued in U.S. Appl. No. 11/967,393 on Apr. 15, 2011; 12 pages.
Notice of Allowance issued in U.S. Appl. No. 12/327,354 on Feb. 1, 2011; 16 pages.
Finin et al.; "KQML as an Agent Communication Language"; retrieved on Jul. 26, 2011; pp. 456-463. <http://portal.acm.org/citation.cfm?id=191322>.
Jennings et al.; "Autonomous Agents for Business Process Management"; 2000 Applied Artificial Intelligence; retrieved on Jul. 25, 2011; pp. 145-189. <http://citeseerx.ist.psu.edu/viewdoc/download?doi=10.1.1.58.624&rep=rep1&1type=pdf>.
Office Action issued in U.S. Appl. No. 12/333,146 on Sep. 6, 2011; 21 pages.
Office Action issued in U.S. Appl. No. 11/322,973 on May 27, 2011; 15 pages.
Office Action issued in U.S. Appl. No. 11/404,147 on Aug. 4, 2011; 26 pages.
Notice of Allowance issued in U.S. Appl. No. 12/233,462 on May 18, 2011; 6 pages.
Office Action issued in U.S. Appl. No. 12/233,457 on May 26, 2011; 19 pages.
Office Action issued in U.S. Appl. No. 12/327,232 on May 26, 2011; 20 pages.
Office Action issued in U.S. Appl. No. 12/327,590 on Jun. 23, 2011; 16 pages.
Office Action issued in U.S. Appl. No. 12/233,087 on Aug. 18, 2011; 42 pages.
Notice of Allowance issued in U.S. Appl. No. 12/233,534 on May 16, 2011; 12 pages.
Notice of Allowance issued in U.S. Appl. No. 11/322,382 on Jul. 25, 2011; 5 pages.
Notice of Allowanced issued in U.S. Appl. No. 11/322,398 on May 27, 2011; 21 pages.
Notice of Allowance issued in U.S. Appl. No. 11/396,250 on Jun. 24, 2011; 5 pages.
Notice of Allowance issued in U.S. Appl. No. 11/396,258 on Jun. 28, 2011; 9 pages.
Office Action issued in U.S. Appl. No. 11/323,040 on Jul. 26, 2011; 34 pages.
Notice of Allowance issued in U.S. Appl. No. 11/397,026 on Jul. 20, 2011; 8 pages.
Office Action issued in U.S. Appl. No. 12/233,489 on May 13, 2011; 15 pages.
Office Action issued in U.S. Appl. No. 11/967,387 on Sep. 8, 2011; 14 pages.
Office Action issued in U.S. Appl. No. 12/233,075 on Aug. 4, 2011; 45 pages.
Notice of Allowance issued in U.S. Appl. No. 11/967,865 on Jun. 24, 2011; 8 pages.
Notice of Allowance issued in U.S. Appl. No. 11/967,890 on Jul. 15, 2011; 7 pages.

* cited by examiner

US 8,326,706 B2

PROVIDING LOGISTICS EXECUTION APPLICATION AS ENTERPRISE SERVICES

BACKGROUND

This specification relates to data processing systems implemented on computers, and more particular to data processing systems providing services in the nature of web services.

Enterprise software systems are generally large and complex. Such systems can require many different components, distributed across many different hardware platforms, possibly in several different geographical locations. Thus, the architecture of a large software application, i.e., what its components are and how they fit together, is an important aspect of its design for a successful implementation.

Web services are one technology for making the functionality of software applications available to other software, including other applications. A web service is a standards-based way of encapsulating the functionality of an application that other applications can locate and access. A service-oriented architecture is a distributed software model within which functionality is defined as independent web services. Within a service-oriented architecture, web services can be used in defined sequences according to business logic to form applications that enable business processes.

SUMMARY

This specification describes a services architecture design that provides enterprise services having production and site logistics execution management functionality at the level of an enterprise application. Enterprise services are web services that have an enterprise-level business value.

In its various aspects, the invention can be embodied in systems, methods, and computer program products. For example, a system in one embodiment implements a services architecture design that provides enterprise services having production and site logistics execution functionality at the level of an enterprise application. The design includes a set of service operations, process components, and optionally deployment units. Suitable business objects are also described.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
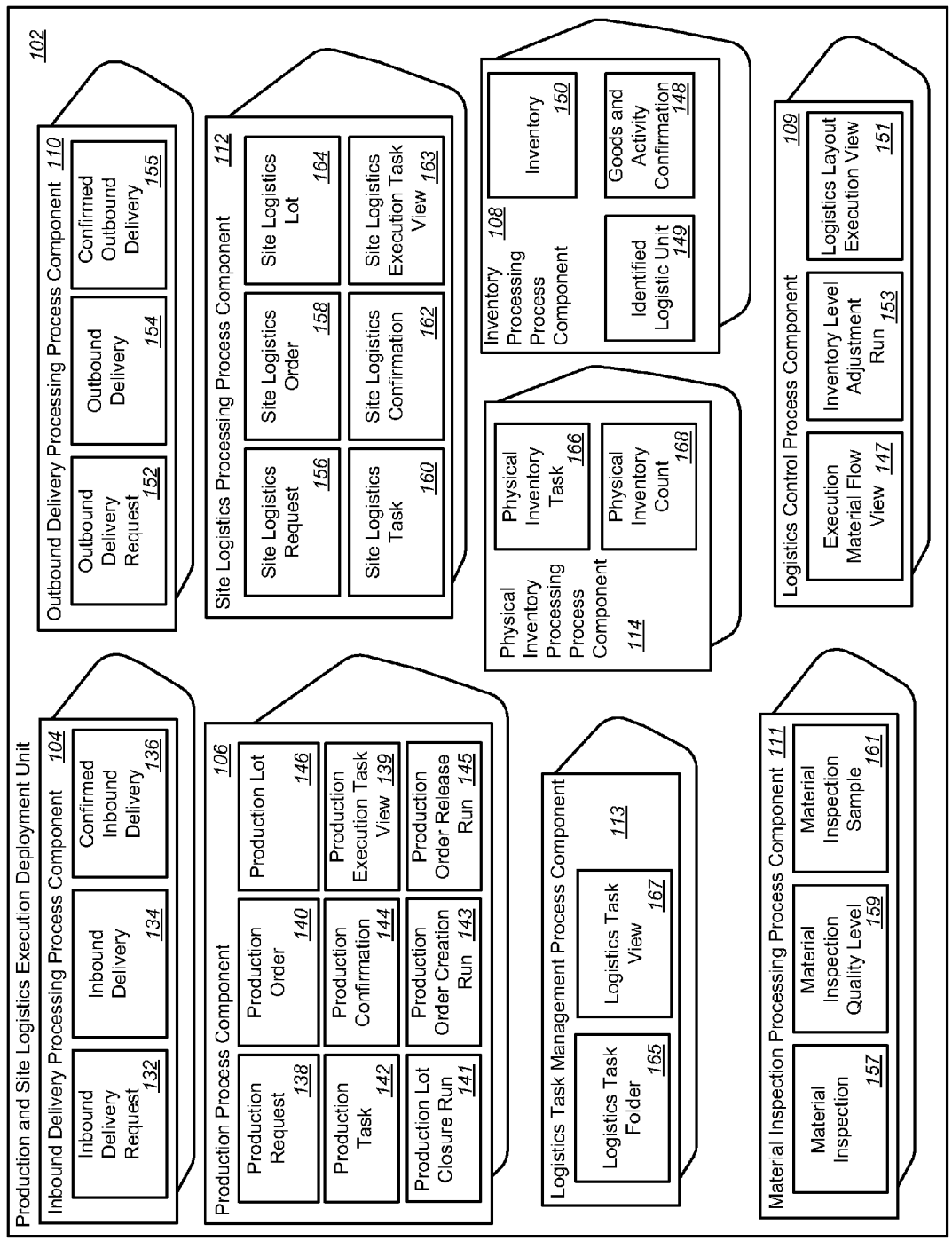
FIGS. 1A, 1B, and 1C collectively illustrate a high-level view of a software architectural design and implementation of a suite enterprise software services having production and site logistics execution functionality.
Figure 1B:
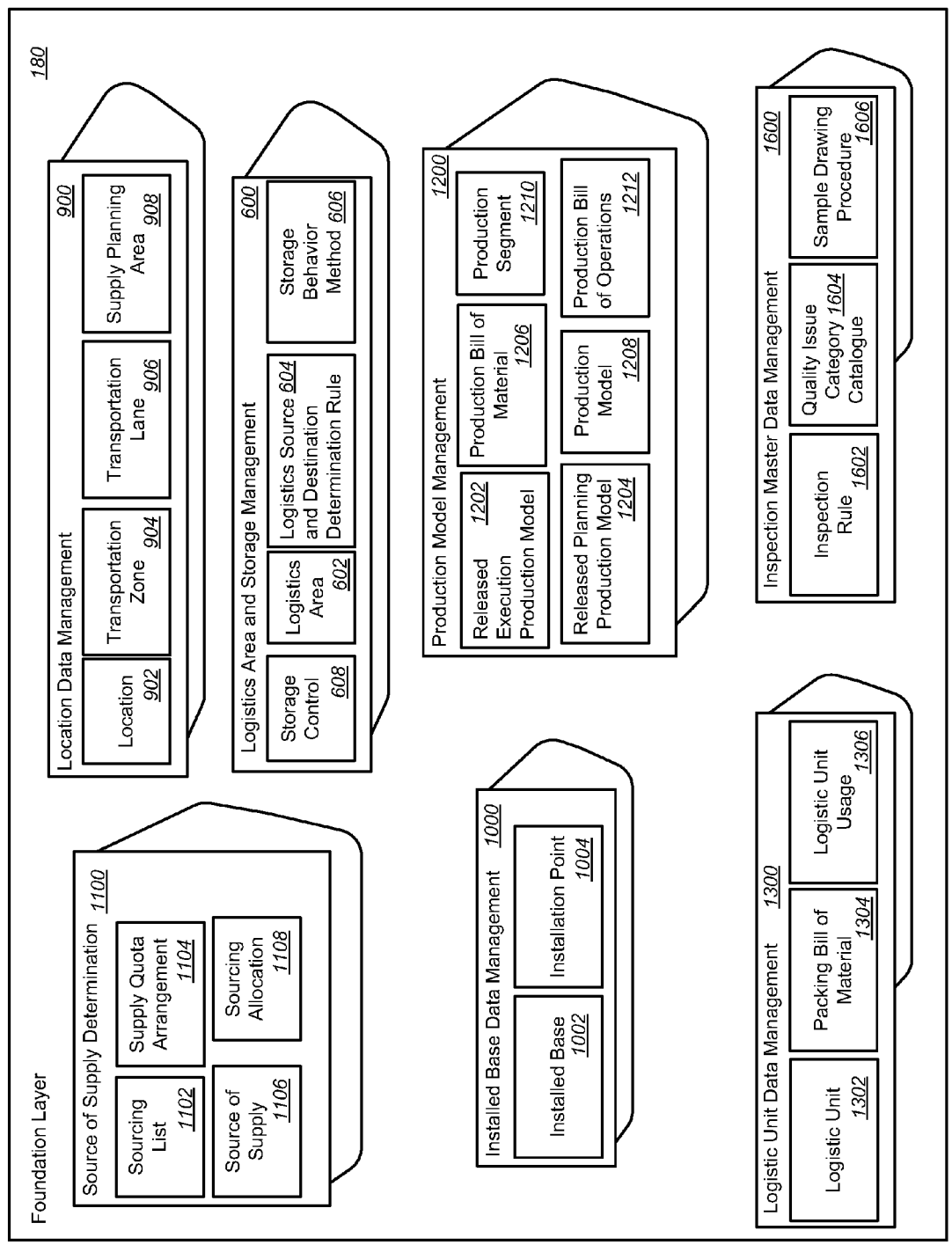
Figure 1C:
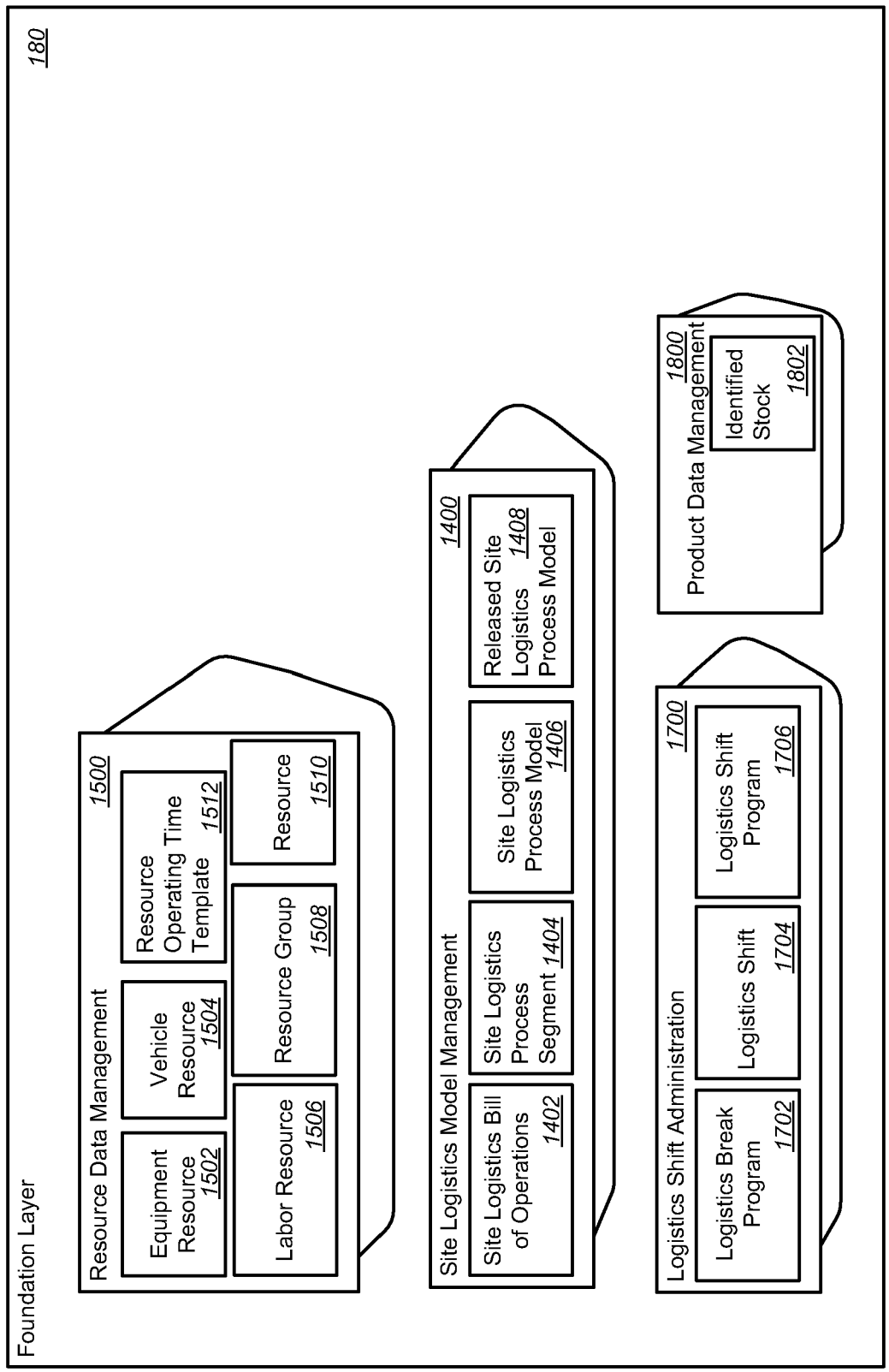

FIGS. 1A, 1B, and 1C collectively illustrate a high-level view of a software architectural design, and of application software implementations of the design, that provides a suite of enterprise service operation, which can be organized into interfaces, having logistic execution application functionality.

The elements of the architecture include the business object, the process component, the service operation (or simply, the operation), the service interface, the message, and the deployment unit. The elements can also include process agents and reuse service components. These will be described below.

In some implementations, the software is implemented to be deployed on an application platform that includes a foundation layer that contains all fundamental entities that can used from multiple deployment units. These entities can be process components, business objects or reuse service components. A reuse service component is a piece of software that is reused in different transactions. A reuse service component is used by its defined interfaces, which can be, e.g., local APIs (Application Programming Interfaces) or service interfaces. When deployed on separate computer platforms, the fundamental entities of the foundation layer should appear the same across all platforms. To achieve this, the foundation layer entities are synchronized across the platforms on which the foundation layer is deployed. Any convenient conventional technique of data record or object synchronization can be implemented to accomplish the synchronization.

The architectural design is a specification of a computer software application, and elements of the architectural design can be implemented to realize a software application that implements enterprise application service interfaces. The elements of the architecture are at times described in this specification as being contained or included in other elements; for example, a process component is described as being contained in a deployment unit. It should be understood, however, that such operational inclusion can be realized in a variety of ways and is not limited to a physical inclusion of the entirety of one element in another.

The architectural elements include the business object. A business object is a representation of a type of a uniquely identifiable business entity (an object instance) described by a structural model. Processes operate on business objects.

A business object represents a specific view on some well-defined business content. A business object represents content, and instances of business objects include content, which a typical business user would expect and understand with little explanation. Whether an object as a type or an instance of an object is intended by the term "object" is generally clear from the context, so the distinction will be made explicitly only when necessary. Also, for convenience and brevity, an object instance may be described in this specification as being or including a real world event, activity, item, or the like; however, such description should be understood as stating that the object instance represents (i.e., contains data representing) the respective event, activity, item, or the like. Properly implemented, business objects are implemented free of redundancies.

Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). A mass data run object is an application object that executes an algorithm for a particular mass data run. An instance of a mass data run object embodies or contains a particular set of selections and parameters. A mass data run object implements an algorithm that modifies, manages, and/or processes a large amount of data in multiple transactions, possibly but not necessarily with parallel processing. A dependent object is a business object used as a reuse part in another business object. A dependent object represents a concept that cannot stand by itself from a business point of view. Instances of dependent objects only occur in the context of a non-dependent business object. A transformed object is a transformation of multiple business objects for a well-defined purpose. It transforms the structure of multiple business objects into a common structure. A transformed object does not have own persistency. The architectural elements also include the process component. A process component is a software package that realizes a business process and generally exposes its functionality as services. The functionality includes the ability to perform all or parts of particular kinds of business transactions. A process component contains one or more semantically related business objects. Any business object belongs to no more than one process component.

Process components are modular and context-independent. That they are context-independent means that a process component is not specific to any specific application and is reusable. The process component is the smallest (most granular) element of reuse in the architecture.

The architectural elements also include the operation. An operation belongs to exactly one process component. A process component generally has multiple operations. Operations can be synchronous or asynchronous, corresponding to synchronous or asynchronous process agents, which will be described below. An operation is the smallest, separately-callable function, described by a set of data types used as input, output, and fault parameters, or some combination of them, serving as a signature. For convenience in supporting use of the operations supported by a system implementing elements of the design, such a system can optionally include a repository of service descriptions that includes a standards-based description of each of the supported service operations.

The architectural elements also optionally include the service interface, which may be referred to simply as an interface. An interface is a named group of operations. Each operation belongs to exactly one interface. An interface belongs to exactly one process component. A process component might implement multiple interfaces. In some implementations, an interface will have only inbound or outbound operations, but not a mixture of both. One interface can include both synchronous and asynchronous operations. All operations of the same type (either inbound or outbound) which belong to the same message choreography will preferably belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component.

The architectural elements also include the process agent. Process agents do business processing that involves the sending or receiving of messages. Each operation will generally have at least one associated process agent. A process agent can be associated with one or more operations. Process agents can be either inbound or outbound, and either synchronous or asynchronous.

Asynchronous outbound process agents are called after a business object changes, e.g., after a create, update, or delete of a business object instance.

Synchronous outbound process agents are generally triggered directly by a business object.

An outbound process agent will generally perform some processing of the data of the business object instance whose change triggered an agent or caused the agent to be called. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents are used when a process component requires a more or less immediate response from another process component, and is waiting for that response to continue its work.

Operations and process components are described in this specification in terms of process agents. However, in alternative implementations, process components and operations can be implemented without use of agents using other conventional techniques to perform the functions described in this specification.

The architectural elements also include the deployment unit. A deployment unit includes one or more process components and, optionally, one or more business objects, that are deployed together on a single computer system platform. Conversely, separate deployment units can be deployed on separate physical computing systems. For this reason, a deployment unit boundary defines the limits of an application-defined transaction, i.e., a set of actions that have the ACID properties of atomicity, consistency, isolation, and durability. To make use of database manager facilities, the architecture requires that all operations of such a transaction be performed on one physical database; as a consequence, the processes of such a transaction must be performed by the process components of one instance of one deployment unit.

The process components of one deployment unit interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units is through service operations, a deployment unit can be replaced by another deployment unit as long as the new deployment unit supports the operations depended upon by other deployment units. Thus, while deployment units can depend on the external interfaces of process components in other deployment units, deployment units are not dependent on process component interactions (i.e., interactions between process components involving their respective business objects, operations, interfaces, and messages) within other deployment units. Similarly, process components that interact with other process components or external systems only through messages, e.g., as sent and received by operations, can also be replaced as long as the replacement supports the operations of the original.

Interactions between process components that occur only within a deployment unit are not constrained to using service operations. These can be implemented in any convenient fashion.

In contrast to a deployment unit, the foundation layer does not define a limit for application-defined transactions. Deployment units communicate directly with entities in the foundation layer, which communication is typically not message based. The foundation layer is active in every system instance on which the application is deployed. Business objects in the foundation layer will generally be master data objects. In addition, the foundation layer will include some business process objects that are used by multiple deployment units. Master data objects and business process objects that should be specific to a deployment unit are preferably assigned to their respective deployment unit.

FIGS. 1A, 1B, and 1C collectively illustrate a high-level view of a software architectural design and implementation of a suite of enterprise software services having production and site logistic execution functionality.

As shown in FIG. 1A, a Production and Site Logistics Execution deployment unit 102 includes an Inbound Delivery Processing process component 104, a Production process component 106, an Inventory Processing process component 108, a Logistics Control process component 109, an Outbound Delivery Processing process component 110, a Material Inspection Processing process component 111, a Site Logistics Processing process component 112, a Logistics Task Management process component 113, and a Physical Inventory Processing process component 114.

The Inbound Delivery Processing process component 104 includes an Inbound Delivery Request business object 132, an Inbound Delivery business object 134, and a Confirmed Inbound Delivery business object 136.

The Production process component 106 includes a Production Request business object 138, a Production Execution Task View business object 139, a Production Order business object 140, a Production Lot Closure Run business object 141, a Production Task business object 142, a Production Order Creation Run business object 143, a Production Confirmation business object 144, a Production Order Release Run business object 145, and a Production Lot business object 146.

The Inventory Processing process component 108 includes a Goods and Activity Confirmation business object 148, an Identified Logistic Unit business object 149, and an Inventory business object 150.

The Logistics Control process component 109 includes an Execution Material Flow View business object 147, an Inventory Level Adjustment Run business object 153, and a Logistics Layout Execution View business object 151.

The Outbound Delivery Processing process component 110 includes an Outbound Delivery Request business object 152, an Outbound Delivery business object 154, and a Confirmed Outbound Delivery business object 155.

The Material Inspection Processing process component 111 includes a Material Inspection business object 157, a Material Inspection Quality Level business object 159, and a Material Inspection Sample business object 161.

The Site Logistics Processing process component 112 includes a Site Logistics Request business object 156, a Site Logistics Order business object 158, a Site Logistics Task business object 160, a Site Logistics Confirmation business object 162, a Site Logistics Execution Task View business object 163, and a Site Logistics Lot business object 164.

The Logistics Task Management process component 113 includes a Logistics Task Folder business object 165 and a Logistics Task View business object 167.

The Physical Inventory Processing process component 114 includes a Physical Inventory task business object 166 and a Physical Inventory Count business object 168.

The Inbound Delivery Request business object 132 represents a request to a product recipient to receive a composition of goods. The Inbound Delivery business object 134 represents a composition of the goods that are received by a product recipient. The Confirmed Inbound Delivery business object 136 represents a confirmation that a certain composition of goods has actually been received by a product recipient.

The Production Request business object 138 represents a request to production execution to produce a certain quantity of a specific material by a requested due date. The Production Request business object 138 also includes accepted and fulfillment data representing a response from production execution. The Production Execution Task View business object 139 represents a view of production execution that is used to process a production task from start to finish.

The Production Order business object 140 represents an order to produce a specific quantity of material within a predefined time. The Production Order business object 140 includes information used for the actual execution of the production process. The Production Lot Closure Run business object 141 represents a specification of an automated run that closes selected production lots. The Production Task business object 142 represents a task in production that a processor executes at a specific time at a predefined production step within a production process. The Production Order Creation Run business object 143 represents a specification of an automated run that creates production orders from production segments of production requests.

The Production Confirmation business object 144 represents a record of confirmed logistic process changes which result from the execution of a production process at a specific time. The Production Confirmation business object 144 includes the following changes: inventory changes, plan adjustments, resource utilizations, service product consumptions, work in-process quantity changes, and progress status changes.

The Production Order Release Run business object 145 represents a specification of an automated run that releases production orders. The Production Lot business object 146 represents a certain quantity of materials that is and has been produced as a group with reference to an order. The Production Lot business object 146 collects information during the production process that is described by operations and activities.

The Goods and Activity Confirmation business object 148 represents a record of confirmed inventory changes that occurred at a specific time. The Inventory business object 150 represents a quantity of all materials in a certain location including the material reservations at that location. Quantities of materials can be physically grouped using an Identified Logistic Unit business object 149 or a Logistic Unit business object 1302.

The Execution Material Flow View business object 147 represents a view on a time-dependent flow of materials, into or out of certain locations, or between locations in logistics execution. The Inventory Level Adjustment Run business object 153 represents a specification of an automated run that adjusts the level of inventory for selected storage locations by initiating replenishment or cleanup. The Logistics Layout Execution View business object 151 represents a floor plan of a defined area, within a location, that reflects a spatial arrangement of logistics areas and resources, combined with a time-dependent view of the definable and measurable parameters that are relevant for logistics execution.

The Outbound Delivery Request business object 152 represents a request to a vendor to compose goods for shipping. The Outbound Delivery business object 154 represents a composition of the goods that are provided for shipping by a vendor. The Confirmed Outbound Delivery business object 155 represents a confirmation from a product recipient that a certain composition of goods has actually been received.

The Material Inspection business object 157 represents a document that describes the execution of an inspection for a particular material, and that is used to record the inspection. The Material Inspection Quality Level business object 159 represents the current quality level for an inspection area. The quality level is determined based on the results of material inspections. The inspection area can include any combination of materials, vendors, receiving plants, or receiving logistics areas. The Material Inspection Sample business object 161 represents a sample used for an examination in the context of a material inspection. The sample is the subject of examination for inspection procedures. A sample can be taken from a material independently of a material inspection and, if necessary, it can later be assigned to a material inspection.

The Site Logistics Request business object 156 represents an internal request for site logistics to prepare and perform, within a certain time period, an outbound, inbound, or internal site logistics process. The Site Logistics Order business object 158 represents a request to handle a specific quantity of stock within a predefined time. The Site Logistics Order business object 158 includes information used for the execution of the site logistics process. The Site Logistics Task business object 160 represents a task for executing a logistics operation or activity within a site. For example, the Site Logistics Task business object 160 can represent a piece of work to be performed by a person or an automated system. The Site Logistics Confirmation business object 162 represents a record of confirmed logistic process changes which result from the execution of a site logistics process at a specific time. Some exemplary changes are inventory changes, plan adjustments, resource utilizations, and progress status changes. The Site Logistics Lot business object 164 represents a certain quantity of materials and/or logistic packages that have been processed as a group with reference to a site logistics request segment or a site logistics order. The Site Logistics Lot business object 164 collects information during the execution of a site logistics process that is described by operations and activities.

The Logistics Task Folder business object 165 represents a folder used for storing and grouping logistics tasks according to business criteria. The Logistics Task Folder business object 165 includes details about processors registered at the folder. The Logistics Task View business object 167 represents a view of logistics tasks providing detailed information to support a worker in selecting and processing a logistics task.

The Physical Inventory Task business object 166 represents a task for executing a count or count-approval activity of a physical inventory count within a site. The Physical Inventory business object 166 represents a piece of work to be performed by a person or by an automated system. The Physical Inventory Count business object 168 represents instructions on how to execute and approve a physical inventory count of materials and packages. The Physical Inventory Count business object 168 also includes results of the physical inventory and any differences between the physical inventory and the book inventory.

In some cases, elements of the design can include process components and other elements that are part of an underlying foundation layer 180. As shown in FIG. 1B, the foundation layer 180 includes a Logistics Area and Storage Management process component 600, a Location Data Management process component 900, an Installed Base Data Management process component 1000, a Source of Supply Determination process component 1100, a Production Model Management process component 1200, a Logistic Unit Data Management process component 1300, and an Inspection Master Data Management process component 1600.

The Logistics Area and Storage Management process component 600 includes a Logistics Area master data object 602, a Logistics Source and Destination Determination Rule master data object 604, a Storage Behavior Method master data object 606, and a Storage Control business object 608.

The Location Data Management process component 900 includes a Location master data object 902, a Transportation Zone master data object 904, a Transportation Lane master data object 906, and a Supply Planning Area master data object 908.

The Installed Base Data Management process component 1000 includes an Installed Base master data object 1002 and an Installation Point master data object 1004.

The Source of Supply Determination process component 1100 includes a Sourcing List transformed object 1102, a Supply Quota Arrangement master data object 1104, a Source of Supply master data object 1106, and a Sourcing Allocation business process object 1108.

The Production Model Management process component 1200 includes a Released Execution Production Model master data object 1202, a Released Planning Production Model master data object 1204, a Production Bill of Material master data object 1206, a Production Model master data object 1208, a Production Segment master data object 1210, and a Production Bill of Operations master data object 1212.

The Logistic Unit Data Management process component 1300 includes a Logistic Unit master data object 1302, a Packing Bill of Material master data object 1304, and a Logistic Unit Usage master data object 1306.

The Inspection Master Data Management process component 1600 includes an Inspection Rule master data object 1602, a Quality Issue Category Catalogue master data object 1604, and a Sample Drawing Procedure master data object 1606.

As shown in FIG. 1C, the foundation layer 180 also includes a Site Logistics Model Management process component 1400, a Resource Data Management process component 1500, a Logistics Shift Administration process component 1700, and a Product Data Management process component 1800.

The Site Logistics Model Management process component 1400 includes a Site Logistics Bill of Operations master data object 1402, a Site Logistics Process Segment master data object 1404, a Site Logistics Process Model master data object 1406, and a Released Site Logistics Process Model master data object 1408. The Resource Data Management process component 1500 includes an Equipment Resource master data object 1502, a Vehicle Resource master data object 1504, a Labor Resource master data object 1506, a Resource Group master data object 1508, a Resource transformed object 1510, and a Resource Operating Time Template master data object 1512.

The Logistics Shift Administration process component 1700 includes a Logistics Break Program master data object 1702, a Logistics Shift master data object 1704, and a Logistics Shift Program master data object 1706. The Product Data Management process component 1800 includes an Identified Stock master data object 1802.

The Site Logistics Bill of Operations master data object 1402 represents a description of a process for a company-internal movement of goods, goods receipt, or goods issue. The Site Logistics Bill of Operations master data object 1402 defines any inventory changes with regard to location, structure, or quantity that may arise as a result of unloading, unpacking, or transportation. The Site Logistics Bill of Operations master data object 1402 also defines the resources, logistic units, standard values, and work instructions to be used.

The Site Logistics Process Segment master data object 1404 represents a part of a logistics process specified by a net of operations for packing, moving and checking of goods. The Site Logistics Process Model master data object 1406 represents a model of a site logistics process that is specified by a sequence of site logistics process segments. The Released Site Logistics Process Model master data object 1408 represents a released version of a site logistics process model that includes elements used for defining and describing the execution of a site logistics process.

The Equipment Resource master data object 1502 represents a machine, device, tool, or a group of identical machines, devices, or tools that has the capacity to provide services. The Vehicle Resource master data object 1504 represents a means of transportation or a group of identical means of transportation that has the capacity to provide transportation services. The Resource Group master data object 1508 represents a grouping of individual resources that provide similar services or have similar physical and functional characteristics.

The Resource transformed object 1510 represents an asset that contributes to the sourcing, production or delivery of a product. The Resource Operating Time Template master data object 1512 represents a template of an operating time definition that includes information used to maintain operating times for multiple resources.

The Logistics Break Program master data object 1702 represents a set of breaks in supply chain processes such as production, warehousing and transportation that are either scheduled at an absolute time of the day or scheduled relative to the start time of a shift. The Logistics Shift master data object 1704 represents a period of working time (called a shift) in supply chain processes such as production, warehousing, and transportation that can be interrupted by breaks. The Logistics Shift Program master data object 1706 represents a set of shifts, organized as a generic program, in supply chain processes such as production, warehousing and transportation that span over a period of time. The Identified Stock master data object 1802 represents a subset of a material that shares a set of common characteristics, is logistically handled separately from other subsets of the same material, and is uniquely identified.

Figure 2A:
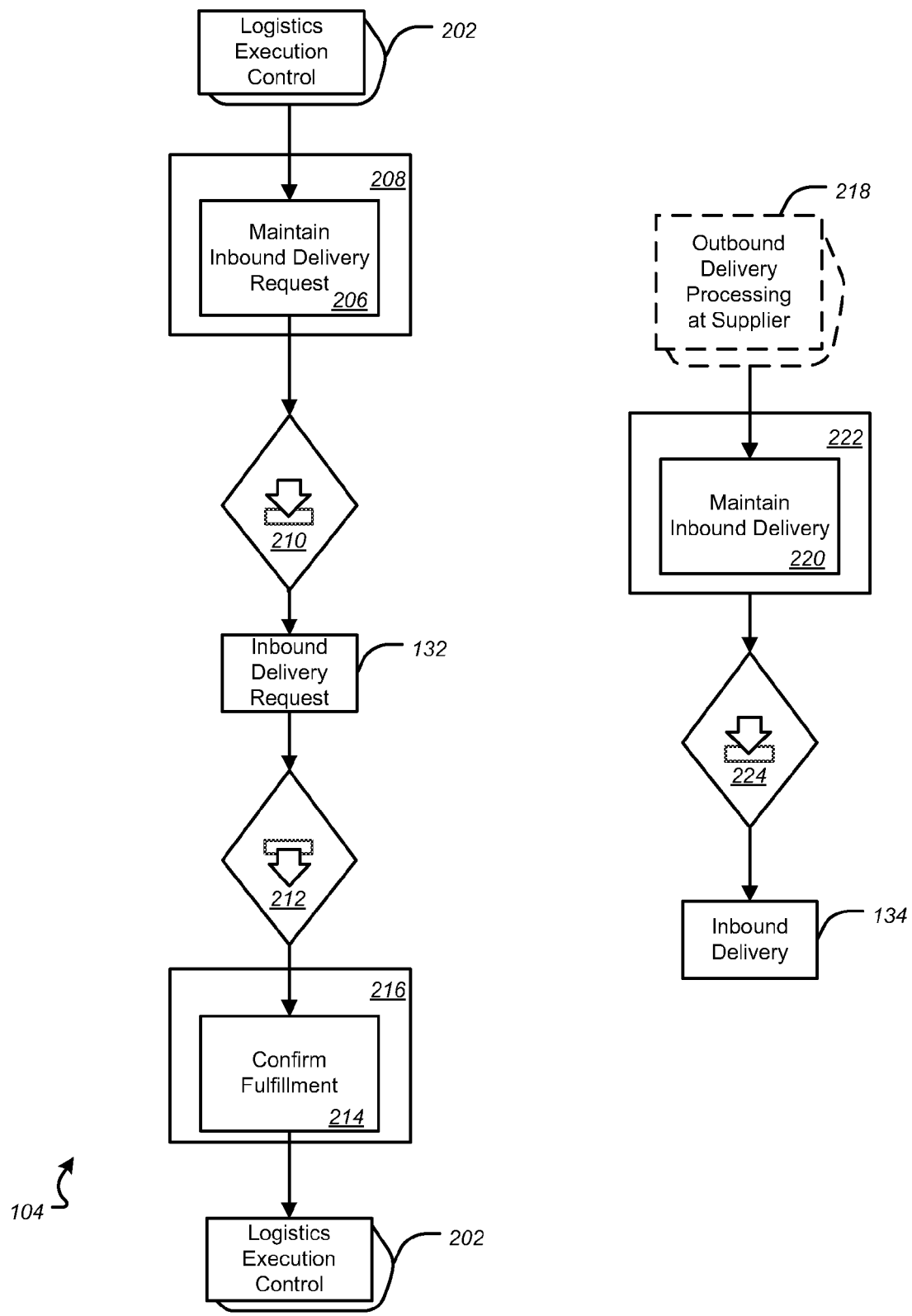
FIGS. 2A and 2B are block diagrams collectively showing an inbound delivery processing process component.
Figure 2B:
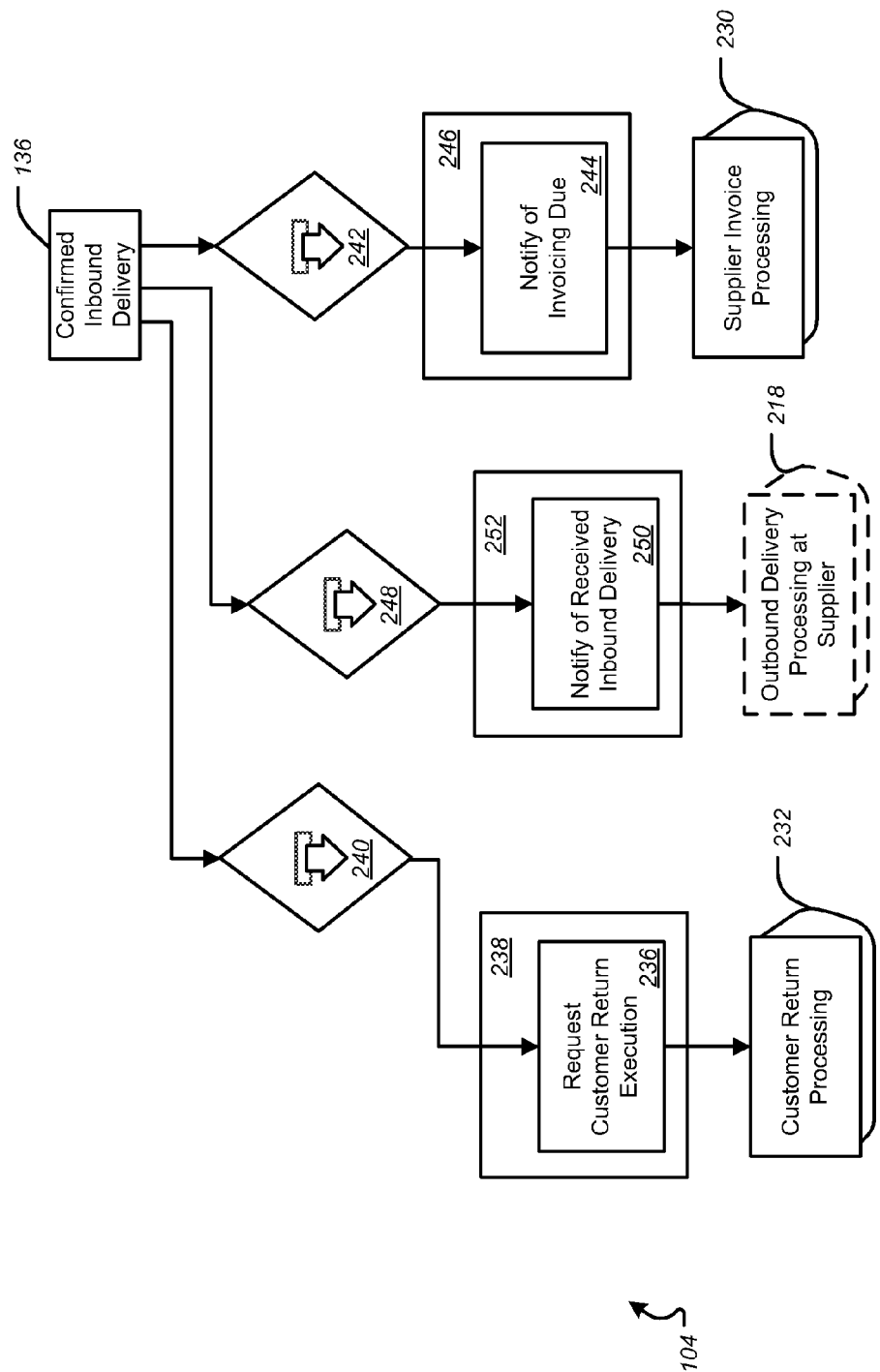

FIGS. 2A and 2B are block diagrams collectively showing an Inbound Delivery Processing process component 104 (FIG. 1A). The Inbound Delivery Processing process component 104 constitutes management and processing of the inbound delivery requirement for received goods from a vendor. For example, the Inbound Delivery Processing process component 104 can combine all document based tasks for the inbound delivery process. The Inbound Delivery Processing process component 104 can also enable communication with the originating document, the vendor, and an invoicing process.

As shown in FIG. 2A, a Logistics Execution Control process component 202, which is external to the process component 104, is included for convenience in describing this process component. The Logistics Execution Control process component 202 creates, controls, and monitors supply chain execution activities that are necessary for the fulfillment of an order on a macro logistics level (e.g., the process component 202 can trigger necessary site logistics activities and receive information about the supply chain execution progress). While the external software can be implemented as such a process component, this is not required.

The Inbound Delivery Request business object 132 represents a request to a product recipient to receive a composition of goods. The Logistics Execution Control process component 202 sends an update to a Maintain Inbound Delivery Request operation 206. The operation 206 is included in a Fulfillment In interface 208. The Maintain Inbound Delivery Request operation 206 receives a delivery fulfillment request from the Logistics Execution Control process component 202. The Maintain Inbound Delivery Request operation 206 triggers a Maintain Inbound Delivery Request asynchronous inbound process agent 210 to update the Inbound Delivery Request business object 132.

The update in the Inbound Delivery Request business object 132 triggers a Confirm Fulfillment of Inbound Delivery Request to Logistics Execution Control asynchronous outbound process agent 212 to invoke a Confirm Fulfillment operation 214. The operation 214 is included in a Fulfillment Out interface 216. The Confirm Fulfillment operation 214 sends a delivery fulfillment confirmation to the Logistics Execution Control process component 202.

An Outbound Delivery Processing at Supplier external process component 218, which is external to the process component 104, is included for convenience in describing this process component. The Outbound Delivery Processing at Supplier process component 218 manages and processes, at a supplier site, outbound delivery requirements for shipping goods to a product recipient. While the external software can be implemented as such a process component, this is not required.

The Outbound Delivery Processing at Supplier process component 218 sends an update to a Maintain Inbound Delivery operation 220. The operation 220 is included in a Delivery Notification In interface 222. The Maintain Inbound Delivery operation 220 receives a dispatched delivery notification from the Outbound Delivery Processing at Supplier process component 218. The Maintain Inbound Delivery operation 220 triggers a Maintain Inbound Delivery asynchronous inbound process agent 224 to update the Inbound Delivery business object 134.

The Inbound Delivery business object 134 represents a composition of the goods that are received by a product recipient.

As shown in FIG. 2B, a Supplier Invoice Processing process component 230 and Customer Return Processing process component 232, which are external to the process component 104, are included for convenience in describing this process component. The Supplier Invoice Processing process component 230 can handle management and volume processing of supplier invoices, including exception handling and approval; the Customer Return Processing process component 232 can process requests made by customers to a seller to take back goods that were delivered, and to reverse the sale; however, while the external software can be implemented as such process components, this is not required.

The Confirmed Inbound Delivery business object 136 represents a confirmation that a certain composition of goods has actually been received by a product recipient.

The Confirmed Inbound Delivery business object 136 uses a Request Customer Return Execution from Confirmed Inbound Delivery to Customer Return Processing asynchronous outbound process agent 240. The Request Customer Return Execution from Confirmed Inbound Delivery to Customer Return Processing asynchronous outbound process agent 240 invokes a Request Customer Return Execution operation 236 that is included in a Request Customer Return Execution Out interface 238. The Request Customer Return Execution operation 236 can send a message to the Customer Return Processing process component 232 requesting execution of a customer return.

The Confirmed Inbound Delivery business object 136 also uses a Request Invoicing from Confirmed Inbound Delivery to Supplier Invoice Processing asynchronous outbound process agent 242. The Request Invoicing from Confirmed Inbound Delivery to Supplier Invoice Processing asynchronous outbound process agent 242 invokes a Notify of Invoicing Due operation 244 in an Invoice Notification Out interface 246. The Notify of Invoicing Due operation 244 sends an invoice due notification to the Supplier Invoice Processing process component 230.

The Confirmed Inbound Delivery business object 136 also uses a Notify of Received Inbound Delivery to Outbound Delivery Processing at Supplier asynchronous outbound process agent 248. The Notify of Received Inbound Delivery to Outbound Delivery Processing at Supplier asynchronous outbound process agent 248 invokes a Notify of Received Inbound Delivery operation 250 in a Delivery Notification Out interface 252. The Notify of Received Inbound Delivery operation 250 sends a received delivery notification to the Outbound Delivery Processing at Supplier process component 218.

Figure 3A:
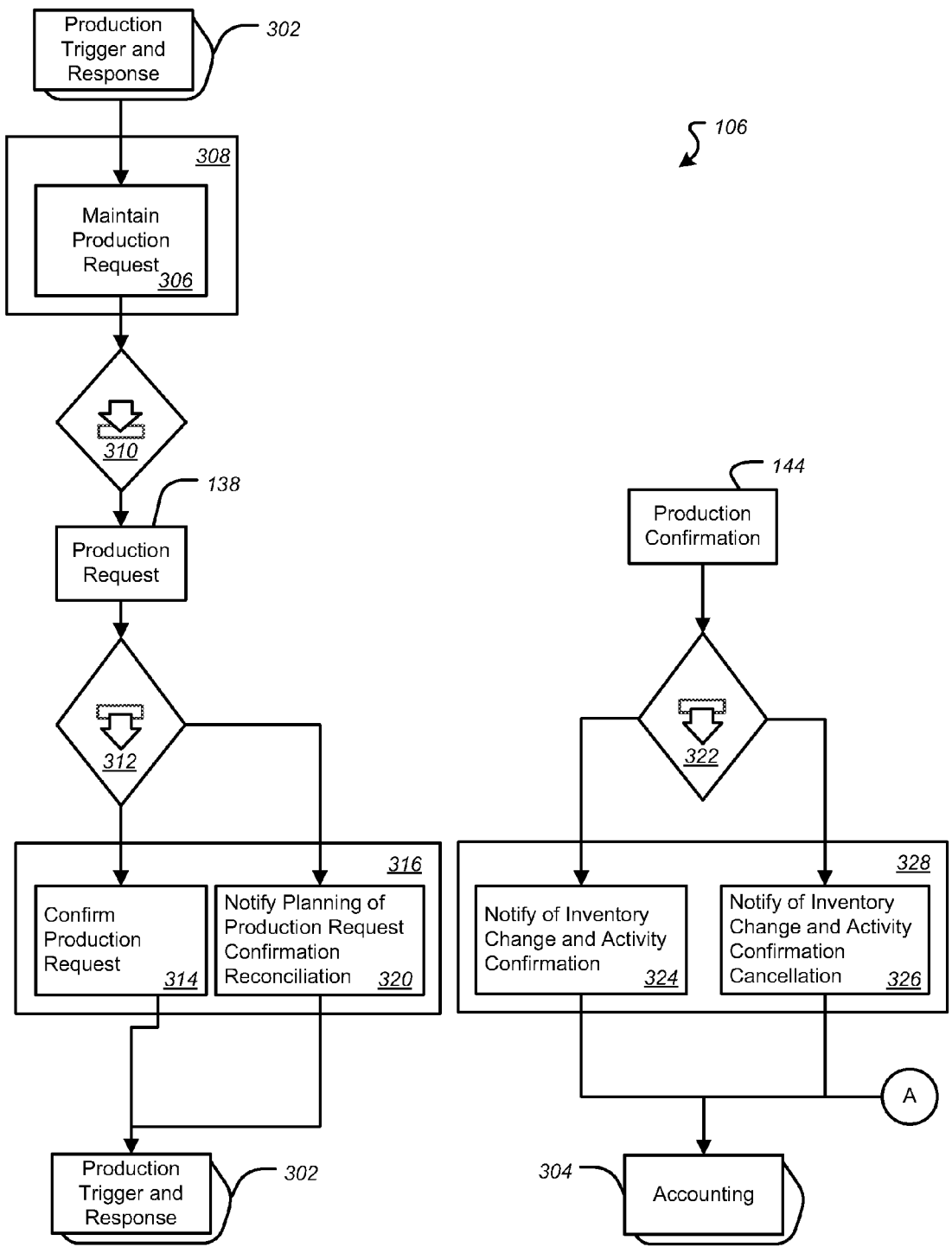
FIGS. 3A and 3B are block diagrams collectively showing a production process component.
Figure 3B:
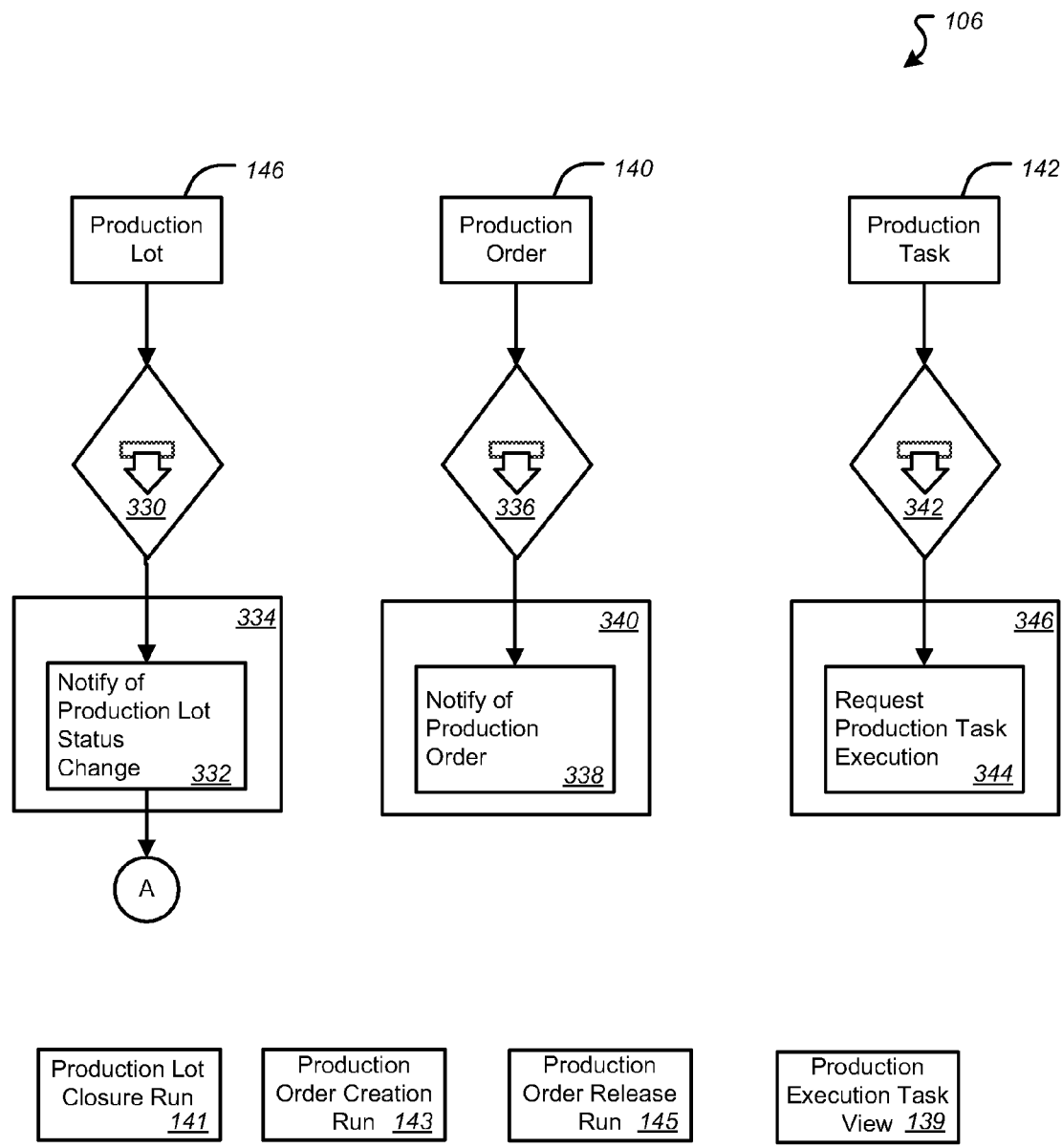

FIGS. 3A and 3B are block diagrams collectively showing a Production process component 106 (FIG. 1A). The Production process component 106 handles the execution of production on a shop floor. The Production process component 106 can handle preparation, execution, confirmation, and completion, as well as more general functions such as scheduling, and monitoring. A Production Trigger and Response process component 302 and an Accounting process component 304, which are external to the process component 106, are included for convenience in describing this process component. The Production Trigger and Response process component 302 provides an interface between planning and production. It handles production requisitions, receives information about the production progress, and updates the planning data accordingly. The Accounting process component 304 records relevant business transactions for valuation and profitability analysis. However, while the external software can be implemented as such process components, this is not required.

As shown in FIG. 3A, the Production process component 106 includes the Production Request business object 138 and the Production Confirmation business object 144. The Production Request business object 138 represents a request to production execution to produce a certain quantity of a specific material by a requested due date. Additionally, the Production Request business object 138 can include accepted and fulfillment data representing the response from the production execution. The Production Confirmation business object 144 can record confirmed logistic process changes resulting from, for example, an execution of a production process. Some example changes are inventory changes, plan adjustments, resource utilizations, service product consumptions, work in-process quantity changes, and progress status changes.

The Production Trigger and Response process component 302 sends an update to a Maintain Production Request operation 306 that is included in a Producing In interface 308. The Maintain Production Request operation 306 sends a production request message to request production. The Maintain Production Request operation 306 triggers a Maintain Production Request inbound process agent 310 to update the Production Request business object 138.

The Production Request business object 138 can receive updated information and send the update into other components to perform further operations. The update in the Production Request business object 138 uses a Confirm Production Request to Production Trigger and Response asynchronous outbound process agent 312 to invoke a Confirm Production Request operation 314 in a Producing Out interface 316. The Confirm Production Request operation 314 then sends a confirmation request to the Production Trigger and Response process component 302 to confirm the maintenance of a production request and its execution progress. The outbound process agent 312 can also invoke a Notify Planning of Production Request Confirmation Reconciliation operation 320 in the interface 316. The Notify Planning of Production Request Confirmation Reconciliation operation 320 can send a production request confirmation reconciliation notification to the Production Trigger and Response process component 302 to notify the planning system of a reconciliation of a production request confirmation.

An update to the Production Confirmation business object 144 triggers a Notify of Production Progress from Production Confirmation to Accounting outbound process agent 322. The Notify of Production Progress from Production Confirmation to Accounting outbound process agent 322 may invoke either a Notify of Inventory Change and Activity Confirmation operation 324 or a Notify of Inventory Change and Activity Confirmation Cancellation operation 326 in an Inventory and Activity Accounting Out interface 328. The Notify of Inventory Change and Activity Confirmation operation 324 notifies the Accounting process component 304 about an inventory change. The Notify of Inventory Change and Activity Confirmation Cancellation operation 326 notifies the Accounting process component 304 about a cancellation of an inventory change or production activity.

As shown in FIG. 3B, the Production process component 106 also includes the Production Execution Task View business object 139, the Production Order business object 140, Production Lot Closure Run business object 141, the Production Task business object 142, the Production Order Creation Run business object 143, the Production Order Release Run business object 145, and the Production Lot business object 146. The Production Lot business object 146 is a certain quantity of materials that is and has been produced as a group with reference to an order. For example, the Production Lot business object 146 collects all the actual information during the production process that is described by operations and activities. The Production Order business object 140 represents an order to produce a specific quantity of material within a predefined time. For example, the Production Order business object 140 can include the information required for the actual execution of the production process. The Production Task business object 142 represents a task in production that a processor executes at a predefined production step within a production process.

The Production Lot Closure Run business object 141 represents a specification of an automated run that closes selected production lots. The Production Order Creation Run business object 143 represents a specification of an automated run that creates production orders from production segments of production requests. The Production Order Release Run business object 145 represents a specification of an automated run that releases production orders.

An update in the Production Lot business object 140 triggers a Notify of Production Lot to Accounting asynchronous outbound process agent 330. The outbound process agent 330 invokes a Notify of Production Lot Status Change operation 332 in a Production Accounting Out interface 334. The Notify of Production Lot Status Change operation 332 then informs the Accounting process component 304 (FIG. 3A) about a status change of a production lot. For example, the Notify of Production Lot Status Change operation 332 can send a production lot accounting notification to inform the Accounting process component 304 about a status change of a production lot.

An update to the Production Order business object 146 triggers a Notify of Production Order for Output asynchronous outbound process agent 336 to invoke a Notify of Production Order operation 338. The operation 338 is included in a Production Order Output Out interface 340. For example, the Notify of Production Order operation 338 can send a notification about a production order.

An update to the Production Task business object 142 triggers a Request Production Task Execution for Output asynchronous outbound process agent 342 to invoke a Request Production Task Execution operation 344 in a Production Task Output Out interface 346. For example, the Request Production Task Execution operation 344 can send messages to request execution of a production task.

Figure 4A:
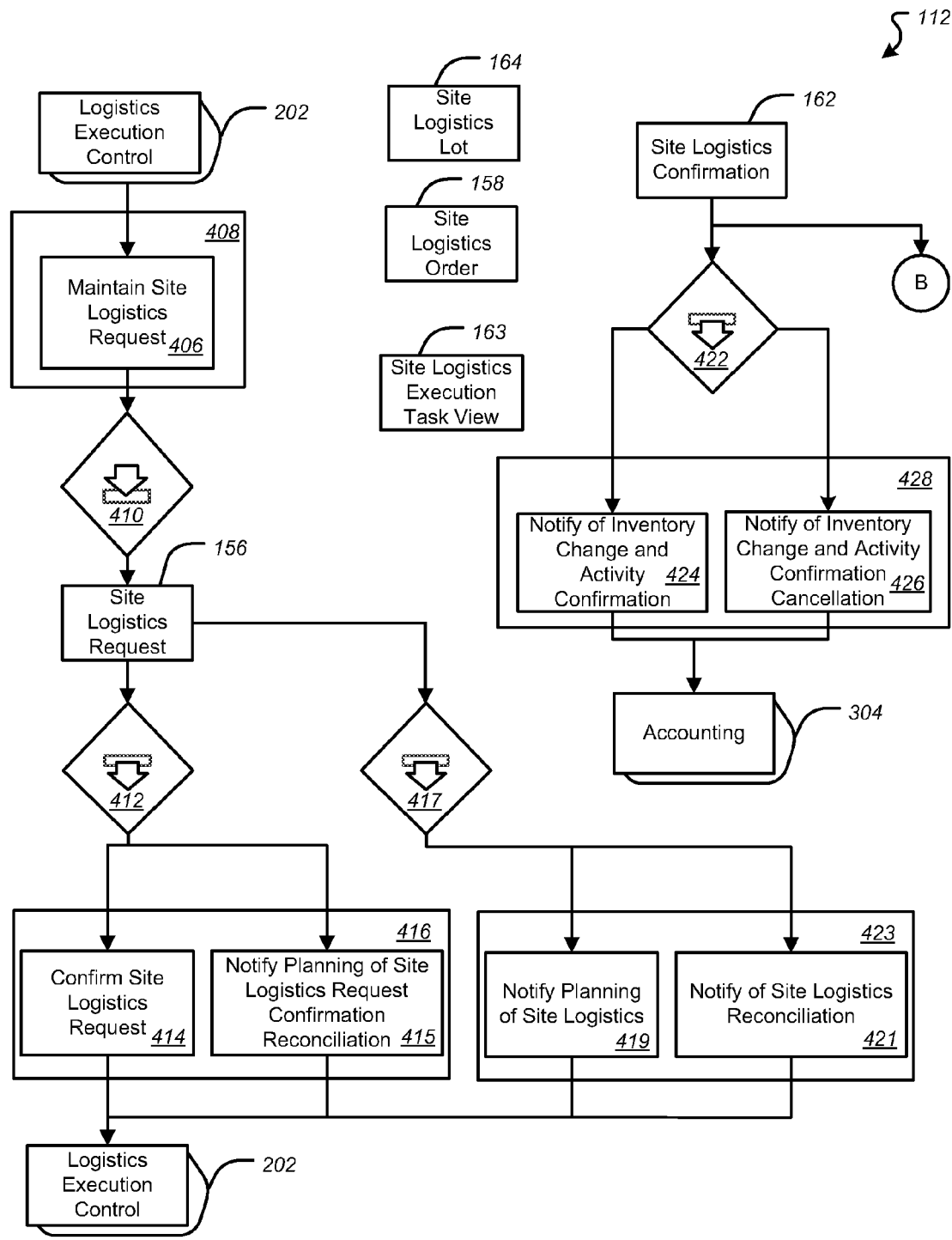
FIGS. 4A and 4B are block diagrams collectively showing a site logistics processing process component.
Figure 4B:
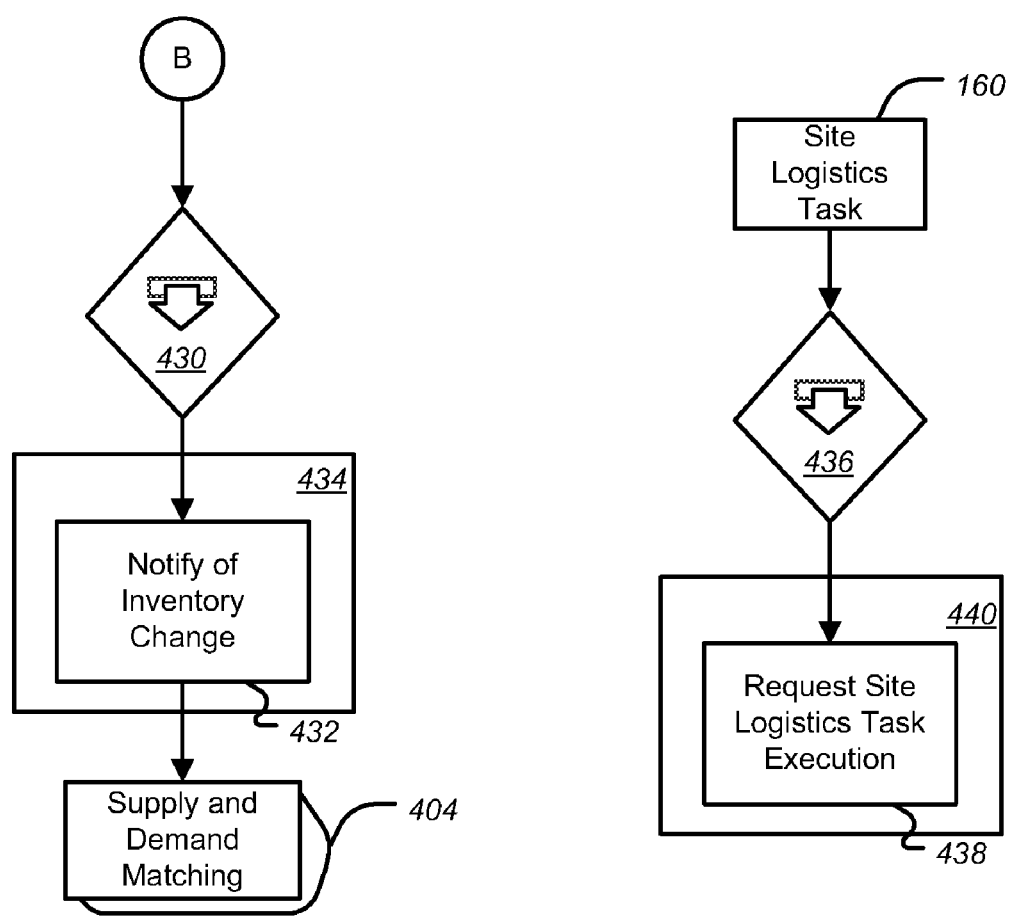

FIGS. 4A and 4B are block diagrams collectively showing the Site Logistics Processing process component 112 (FIG. 1A). The Site Logistics Processing process component 112 supports all preparing, execution, and confirmation of logistics processes within a site (e.g., logistics processes may include picking, packing, shipping, receiving as well as value added services.).

The Logistics Execution Control process component 202, the Accounting process component 304, and a Supply and Demand Matching process component 404, which are external to the process component 112, are included for convenience in describing this process component. However, while the external software can be implemented as such process components, this is not required. The Supply and Demand Matching process component 404 handles management of tasks necessary to ensure that sufficient material receipt elements exist to cover material demand while taking available capacity into account.

As shown in FIG. 4A, the Site Logistics Processing process component 112 also includes the Site Logistics Request business object 156, the Site Logistics Order business object 158, the Site Logistics Confirmation business object 162, the Site Logistics Execution Task View business object 163, and the Site Logistics Lot business object 164.

The Site Logistics Request business object 156 represents an internal request for site logistics to prepare and perform, within a certain time period, an outbound, inbound, or internal site logistics process. The Logistics Execution Control process component 202 may send a message to the Site Logistics Processing process component 112, which is handled by a Maintain Site Logistics Request operation 406 in a Site Logistics Processing In interface 408. For example, the Maintain Site Logistics Request operation 406 can create, update or delete the Site Logistics Request business object 156 using a Maintain Site Logistics Request inbound process agent 410. The update in the Site Logistics Request business object 156 can trigger a Confirm Site Logistics Request to Logistic Execution Control asynchronous outbound process agent 412 to invoke a Confirm Site Logistics Request operation 414 or a Notify Planning of Site Logistics Request Confirmation Reconciliation operation 415 in a Site Logistics Processing Out interface 416.

The Confirm Site Logistics Request operation 414 can confirm receipt of a site logistics request and acknowledge quantities and delivery dates of the request. Furthermore, the operation 414 can inform the Logistics Execution Control process component 202 about inventory changes and fulfillment of the Site Logistics Processing process component 112. The Notify Planning of Site Logistics Request Confirmation Reconciliation operation 415 can notify the Logistics Execution Control process component 202 of a reconciliation of a site logistics request confirmation.

The Site Logistics Order business object 158 represents a request to handle a specific quantity of stock within a predefined time. The Site Logistics Order business object 158 includes information used for the execution of the site logistics process. The Site Logistics Lot business object 164 represents a certain quantity of materials and/or logistic packages that has been processed as a group with reference to a site logistics request segment or a site logistics order. The Site Logistics Lot business object 164 collects information during the execution of a site logistics process that is described by operations and activities.

The Site Logistics Confirmation business object 162 represents a record of confirmed logistic process changes which result from the execution of a site logistics process at a specific time. Some exemplary changes are inventory changes, plan adjustments, resource utilizations, and progress status changes.

An update in the Site Logistics Confirmation business object 162 can trigger a Notify of Inventory Change from Site Logistics Confirmation to Accounting outbound process agent 422. The Notify of Inventory Change from Site Logistics Confirmation to Accounting outbound process agent 422 can invoke a Notify of Inventory Change and Activity Confirmation operation 424 or a Notify of Inventory Change and Activity Confirmation Cancellation operation 426 in an Inventory and Activity Accounting Out interface 428. If the Notify of Inventory Change and Activity Confirmation operation 424 is invoked, it sends an inventory change accounting notification to the Accounting process component 304. If the Notify of Inventory Change and Activity Confirmation Cancellation operation 426 is invoked, it sends a inventory change accounting cancellation to the Accounting process component 304.

An update in the Site Logistics Confirmation business object 162 can also trigger a Notify of Site Logistics Request to Logistics Execution Control outbound process agent 417. The Notify of Site Logistics Request to Logistics Execution Control outbound process agent 417 can invoke a Notify Planning of Site Logistics operation 419 or a Notify of Site Logistics Reconciliation operation 421 in a Site Logistics Notification Out interface 423. If the Notify Planning of Site Logistics operation 419 is invoked, a notification is sent to the Logistics Execution Control process component 202 to notify about the creation of a new site logistics request and to create a site logistics requisition or update relevant inventory changes in an existing site logistics requisition. If the Notify of Site Logistics Reconciliation operation 421 is invoked, the Logistics Execution Control process component 202 is sent a notification to notify of a reconciliation of a site logistics request.

As shown in FIG. 4B, an update in the Site Logistics Confirmation business object 162 (FIG. 4A) triggers a Notify of Inventory Change from Site Logistics Confirmation to a Supply and Demand Matching (SDM) outbound process agent 430. The Notify of Inventory Change from Site Logistics Confirmation to SDM outbound process agent 430 invokes a Notify of Inventory Change operation 432 in an Inventory Changing Out interface 434. The operation 432 can send an inventory change planning notification to the Supply and Demand process component 404.

As shown in FIG. 4B, the Site Logistics Processing process component 112 also includes the Site Logistics Task business object 160. The Site Logistics Task business object 160 represents a task for executing a logistics operation or activity within a site. For example, the Site Logistics Task business object 160 can represent a piece of work to be performed by a person or an automated system.

The Site Logistics Task business object 160 can use a Request Site Logistics Task Execution for Output asynchronous outbound process agent 436. The Request Site Logistics Task Execution for Output outbound process agent 436 invokes a Request Site Logistics Task Execution operation 438 in a Site Logistics task Output Out interface 440 to request the printing of site logistics task instructions.

Figure 5:
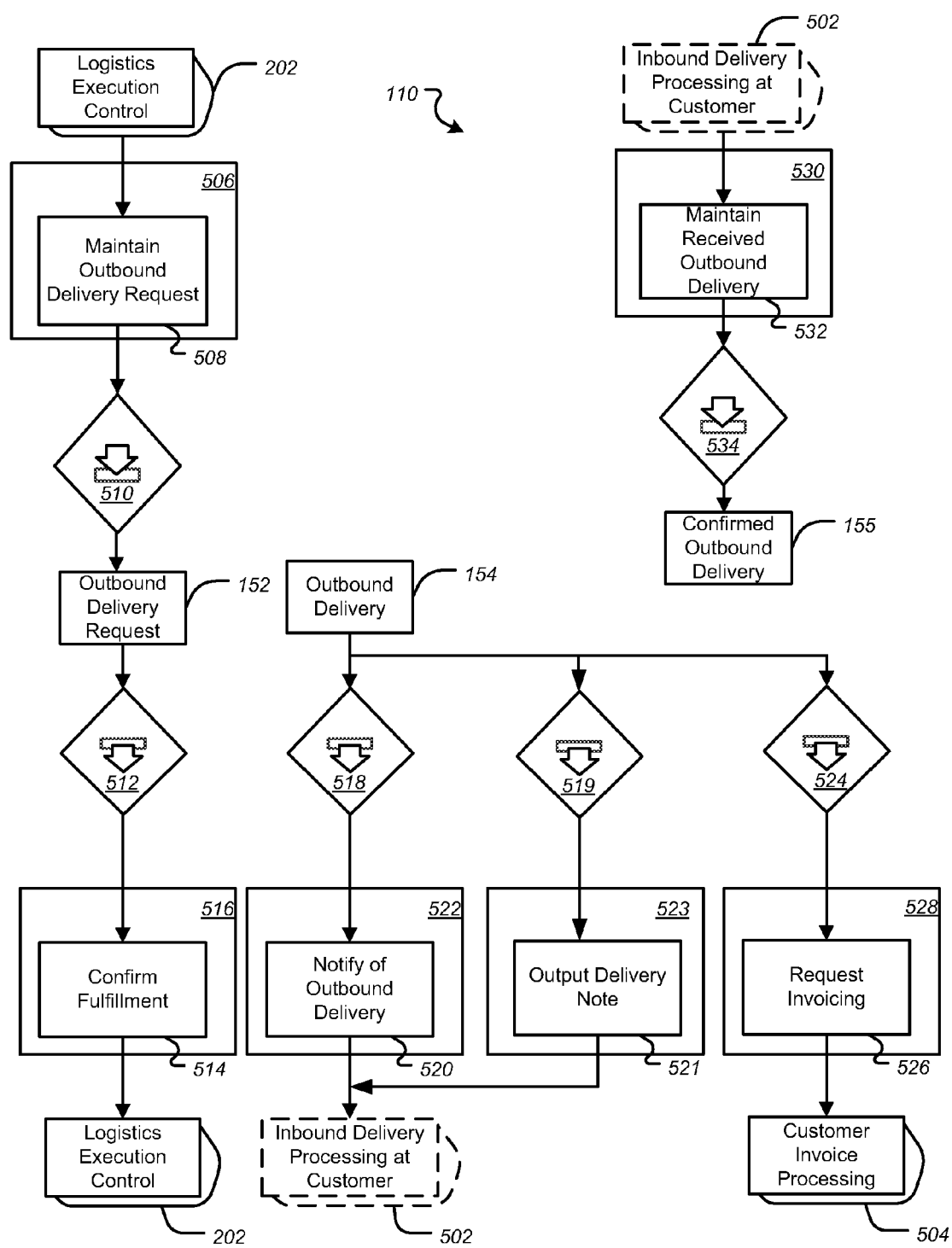
FIG. 5 is a block diagram of an outbound delivery processing process component.

FIG. 5 is a block diagram of the Outbound Delivery Processing process component 110 (FIG. 1A). The Outbound Delivery Processing process component 110 handles the management and processing of outbound delivery requirements for shipping goods to a product recipient. It combines all document-based tasks for the outbound delivery process, and enables communication with an originating document, a product recipient, and invoicing.

An Inbound Delivery Processing at Customer process component 502, a Customer Invoice Processing process component 504, and the Logistics Execution Control process component 202, which are external to the process component 110, are included for convenience in describing this process component. For example, the Inbound Delivery Processing at Customer process component 502 constitutes logistics execution driven by an inbound delivery request for receiving goods from a vendor at a customer. For example, the process component 502 may combine all tasks concerning the inbound delivery process (preparation and triggering of execution), and enable communication with the vendor and invoicing. This process component is drawn with dashed lines to indicate that it is used to represent an external system in describing interactions with the external system; this should be understood to require no more of the external system than that it be able to produce and receive messages as required by the process component that interacts with the external system. The Customer Invoice Processing process component 504 is used to process invoicing of customers for the delivery of goods or the provision of services. However, while the external software can be implemented as such process components, this is not required.

The Outbound Delivery Processing process component 110 includes the Outbound Delivery Request business object 152 and the Outbound Delivery business object 154.

The Outbound Delivery Request business object 152 is a request to a vendor to compose goods for shipping. The Logistics Execution Control process component 202 sends an update to a Maintain Outbound Delivery Request operation 508 included in a Fulfillment In interface 506. After receiving a delivery fulfillment request from the Logistics Execution Control process component 202, the Maintain Outbound Delivery Request operation 508 then triggers a Maintain Outbound Delivery Request asynchronous inbound process agent 510 to update the Outbound Delivery Request business object 152. The update in the Outbound Delivery Request business object 152 invokes a Confirm Fulfillment of Outbound Delivery Request to Logistics Execution Control outbound process agent 512. The Confirm Fulfillment of Outbound Delivery Request to Logistics Execution Control outbound process agent 512 then invokes a Confirm Fulfillment operation 514 in a Fulfillment Out interface 516. The operation 514 can confirm the partial or complete fulfillment of a customer requirement to the creator of the requirement. For example, the Confirm Fulfillment operation 514 sends a delivery fulfillment confirmation message to the Logistics Execution Control process component 202.

The Outbound Delivery business object 154 is a request to a vendor to compose goods for shipping. An update in the Outbound Delivery business object 154 triggers a Notify of Outbound Delivery for Output to Inbound Delivery Processing at Customer outbound process agent 518 or Output Delivery Note to Inbound Delivery Processing at Customer asynchronous outbound process agent 519 and/or a Request Invoicing from Outbound Delivery to Customer Invoice Processing asynchronous outbound process agent 524. The Notify of Outbound Delivery to Inbound Delivery Processing at Customer asynchronous outbound process agent 518 invokes a Notify of Outbound Delivery operation 520 in a Delivery Notification Out interface 522 to send a dispatched delivery notification to the Inbound Delivery Processing at Customer process component 502. Output Delivery Note to Inbound Delivery Processing at Customer asynchronous outbound process agent 519 invokes an Output Delivery Note operation 521 in a Delivery Note Out interface 523 to send a dispatched delivery notification to the Inbound Delivery Processing at Customer process component 502. The Request Invoicing from Outbound Delivery to Customer Invoice Processing asynchronous outbound process agent 524 invokes a Request Invoicing operation 526 in a Request Invoicing Out interface 528 to send a request of invoicing of service contract from the Customer Invoicing Processing process component 504.

The Confirmed Outbound Delivery business object 155 is a confirmation from the product recipient that a certain composition of goods has actually been received. The Inbound Delivery Processing at Customer process component 502 sends an update to a Maintain Received Outbound Delivery operation 532 included in a Delivery Notification In interface 530. After receiving a delivery fulfillment request from the Inbound Delivery Processing at Customer process component 502, the Maintain Received Outbound Delivery operation 532 then triggers a Maintain Received Outbound Delivery asynchronous inbound process agent 534 to update the Confirmed Outbound Delivery business object 155.

Figure 6:
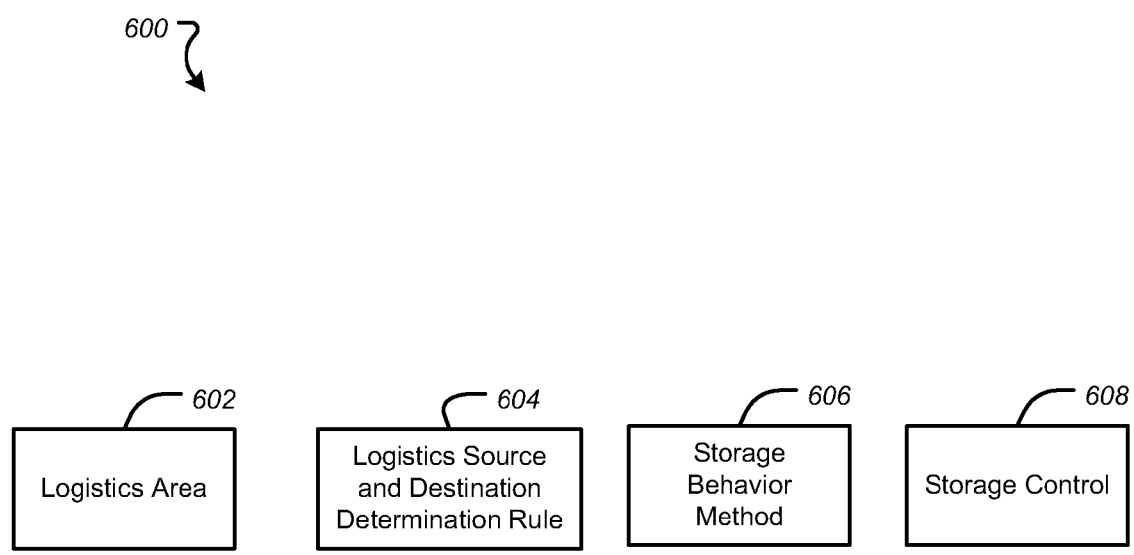
FIG. 6 is a block diagram of a logistics area and storage management process component.

FIG. 6 is a block diagram showing the Logistics Area and Storage Management process component 600 (FIG. 1B) of the foundation layer 180. The Logistics Area and Storage Management process component 600 handles maintenance of logistics area master data along with storage methods, and placement and retrieval rules for inventory.

The Logistics Area and Storage Management process component 600 includes the Logistics Area business object 602, the Logistics Source and Destination Determination Rule business object 604, the Storage Behavior Method business object 606, and the Storage Control business object 608. The Logistics Area business object 602 is a freely definable area within a location providing detailed physical and operational information required for storage and production. Logistics areas can be arranged in a hierarchy according to physical aspects or logistical functions. The Logistics Source and Destination Determination Rule business object 604 is a rule for identifying the source storage location for inventory retrieval or the destination storage location for inventory placement. The Storage Behavior Method business object 606 is a set of rules that defines the manner in which a storage location is managed. The Storage Control business object 608 is a specification of inventory items' constraints and inventory items' rules applied in a storage location, such as logistics area or resource, as well as requirements for actions, i.e., replenishment or cleanup.

Figure 7A:
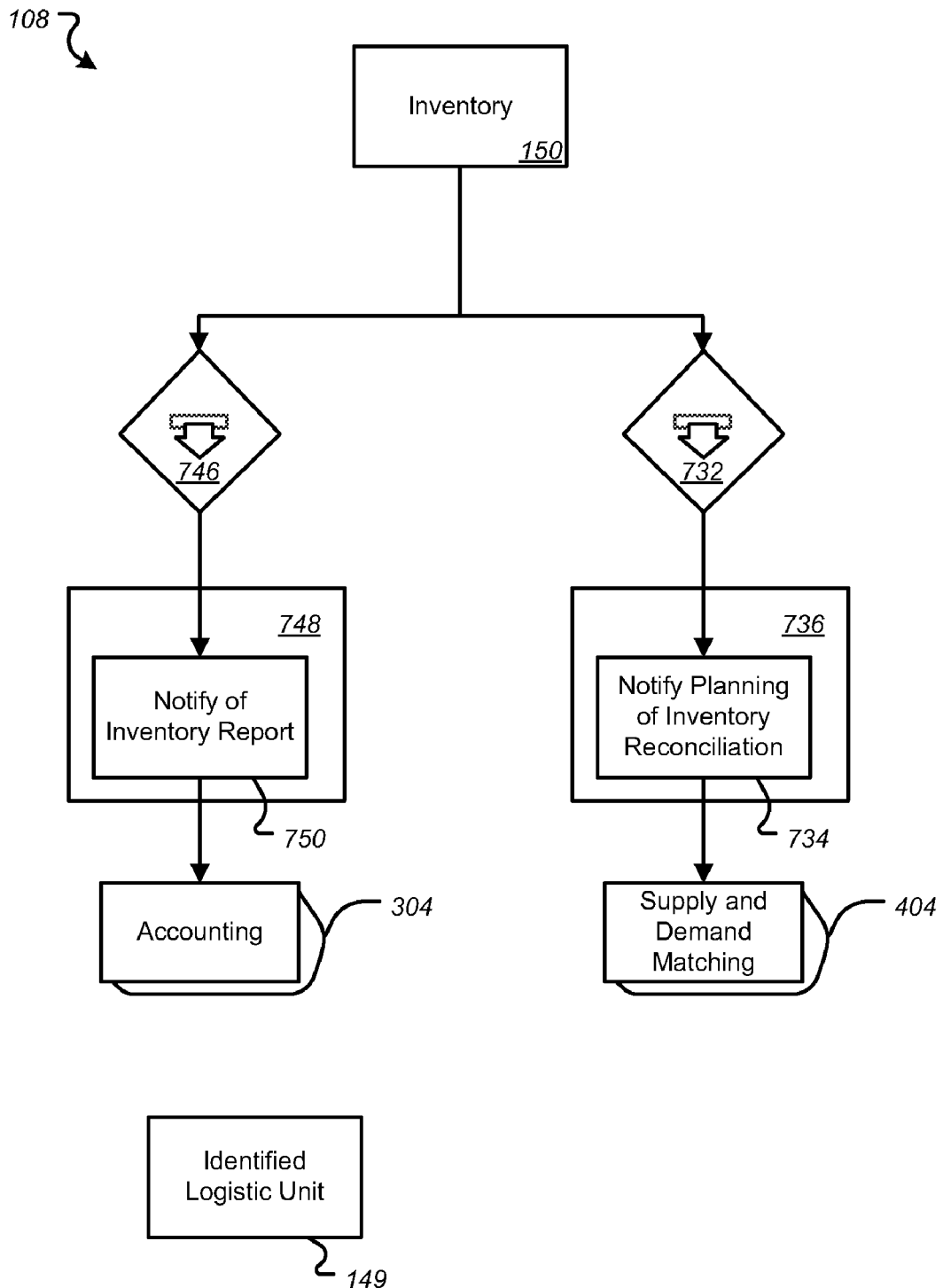
FIGS. 7A and 7B are block diagrams collectively showing an inventory processing process component.
Figure 7B:
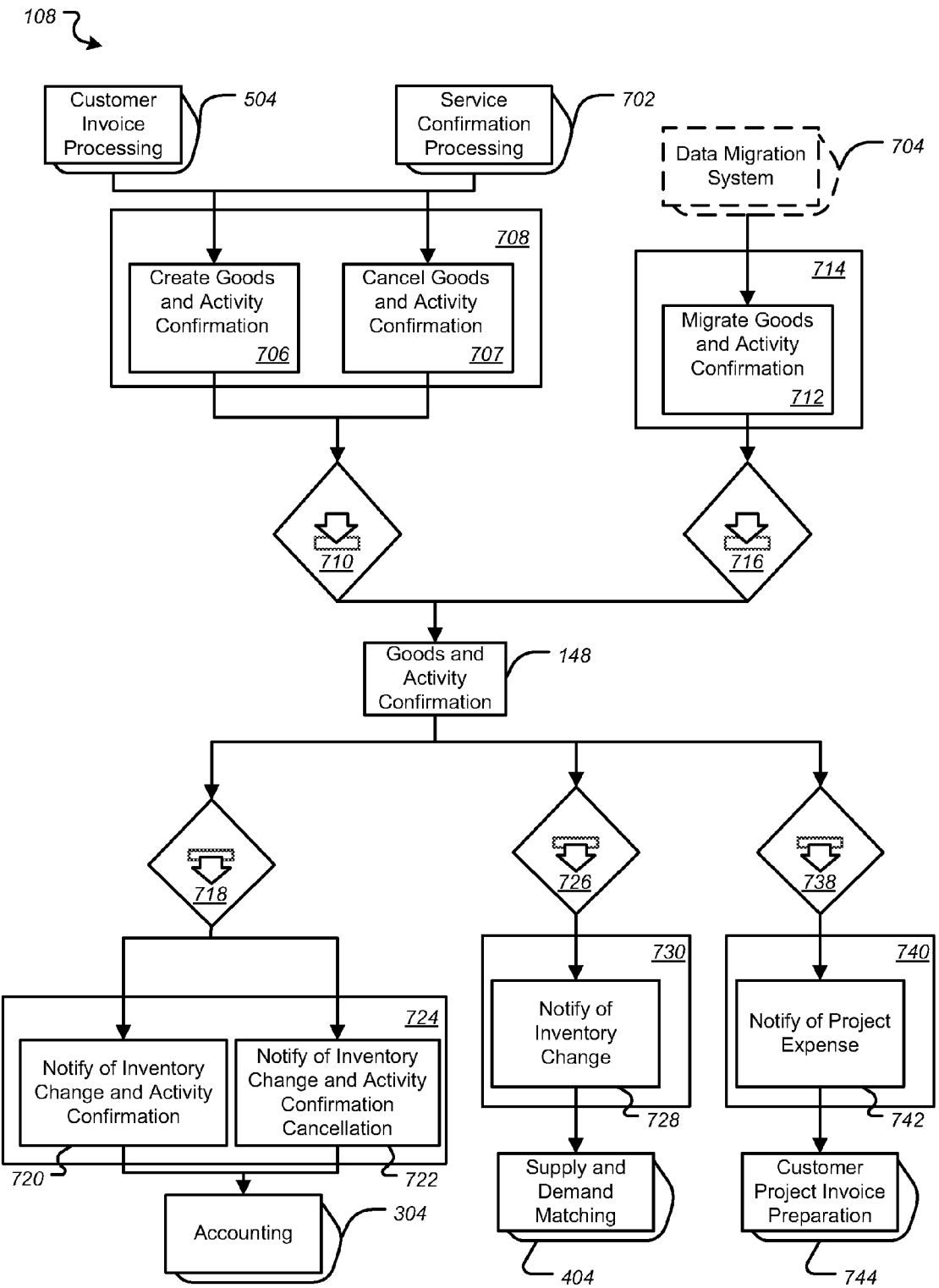

FIGS. 7A and 7B are a block diagram collectively showing an Inventory Processing process component 108 (FIG. 1A). The Inventory Processing process component 108 handles processing of inventory and recording of inventory changes. For example, the Inventory Processing process component 108 can provide services to maintain current stock, content and structure of logistic units and allocations. The Accounting process component 304, the Supply and Demand Matching process component 404, the Customer Invoice Processing process component 504, a Service Confirmation Processing process component 702, a Data Migration System process component 704, and a Customer Project Invoice Preparation process component 744 which are external to the process component 108, are included for convenience in describing this process component. The Service Confirmation Processing process component 702 is used to handle services rendered for a service order. This includes reporting back working times, materials used, as well as any expenses incurred during the service activities. However, while the external software can be implemented as such process components, this is not required.

As shown in FIG. 7A, the Inventory Processing process component 108 includes the Inventory business object 150 and the Identified Logistic Unit business object 149. The Inventory business object 150 is a document showing quantity of the materials in a location including the material reservations at the location. The Identified Logistic Unit business object 149 represents a physical unit existing exactly once in the real world, which is identifiable for logistic purposes. The Identified Logistic Unit business object 149 describes the logistics and physical aspects of a product or package.

In the depicted example, the Inventory Processing process component 108 includes a Notify of Inventory Reconciliation from Inventory to Supply and Demand Matching asynchronous outbound process agent 732. The Notify of Inventory Reconciliation from Inventory to Supply and Demand Matching asynchronous outbound process agent 732 invokes a Notify Planning of Inventory Reconciliation operation 734 in an Inventory Reconciliation Out interface 736 to send an inventory reconciliation to the Supply and Demand Matching process component 404.

The Inventory Processing process component 108 also includes a Notify of Inventory Report from Inventory to Accounting outbound process agent 746. The Notify of Inventory Report from Inventory to Accounting outbound process agent 746 invokes a Notify of Inventory Report operation 750 included in an Inventory Report Accounting Out interface 748 to send an inventory report to the Accounting process component 304.

As shown in FIG. 7B, the Inventory Processing process component 108 includes the Goods and Activity Confirmation business object 148. The Goods and Activity Confirmation business object 148 contains all actual data reflecting an 'ad-hoc' executed work (e.g., scrapping, goods issue for account assignment, change of stock category). The execution of work may not be pre-planned based on a production or site logistics order.

The Service Confirmation Processing process component 702 or Customer Invoice Processing process agent 504 creates the Goods and Activity Confirmation business object 148 using a Create Goods and Activity Confirmation operation 706 in an Inventory Changing In interface 708. The Create Goods and Activity Confirmation operation 706 uses a Maintain Goods and Activity Confirmation asynchronous inbound process agent 710 to create the Goods and Activity Confirmation business object 148.

The Service Confirmation Processing process component 702 or Customer Invoice Processing process agent 504 can also cancel the Goods and Activity Confirmation business object 148 using a Cancel Goods and Activity Confirmation operation 707 in an Inventory Changing In interface 708. The Cancel Goods and Activity Confirmation operation 706 uses a Maintain Goods and Activity Confirmation asynchronous inbound process agent 710 to cancel the Goods and Activity Confirmation business object 148.

The Data Migration System process component 704 uses a Replicate Goods and Activity Confirmation operation 712 in a Goods and Activity Confirmation Replication In interface 714 to replicate the Goods and Activity Confirmation business object 148 for migration. The Replicate Goods and Activity Confirmation operation 712 uses a Replicate Goods and Activity Confirmation asynchronous inbound process agent 716 to replicate the Goods and Activity Confirmation business object 148.

An update to the Goods and Activity Confirmation business object 148 triggers a Notify of Inventory Change from Goods and Activity Confirmation to Accounting outbound process agent 718, a Notify of Inventory Change from Confirmation to Supply and Demand Matching outbound process agent 726, and a Notify of Inventory Change from Goods and Activity Confirmation to Customer Project Invoice Preparation outbound process agent 738.

The Notify of Inventory Change from Goods and Activity Confirmation to Accounting outbound process agent 718 can invoke either a Notify of Inventory Change and Activity Confirmation operation 720 or a Notify of Inventory Change and Activity Confirmation Cancellation operation 722, both included in an Inventory and Activity Accounting Out interface 724. If the Notify of Inventory Change and Activity Confirmation operation 720 is invoked, then an inventory change accounting notification is sent to the Accounting process component 304. If the Notify of Inventory Change and Activity Confirmation Cancellation operation 722 is invoked, then an inventory change accounting cancellation message is sent to the Accounting process component 304.

The Notify of Inventory Change from Confirmation to Supply and Demand Matching asynchronous outbound process agent 726 invokes a Notify of Inventory Change operation 728 in an Inventory Chancing Out interface 730. The Notify of Inventory Change operation 728 sends an inventory change planning notification to the Supply and Demand Matching process component 404.

Figure 8:
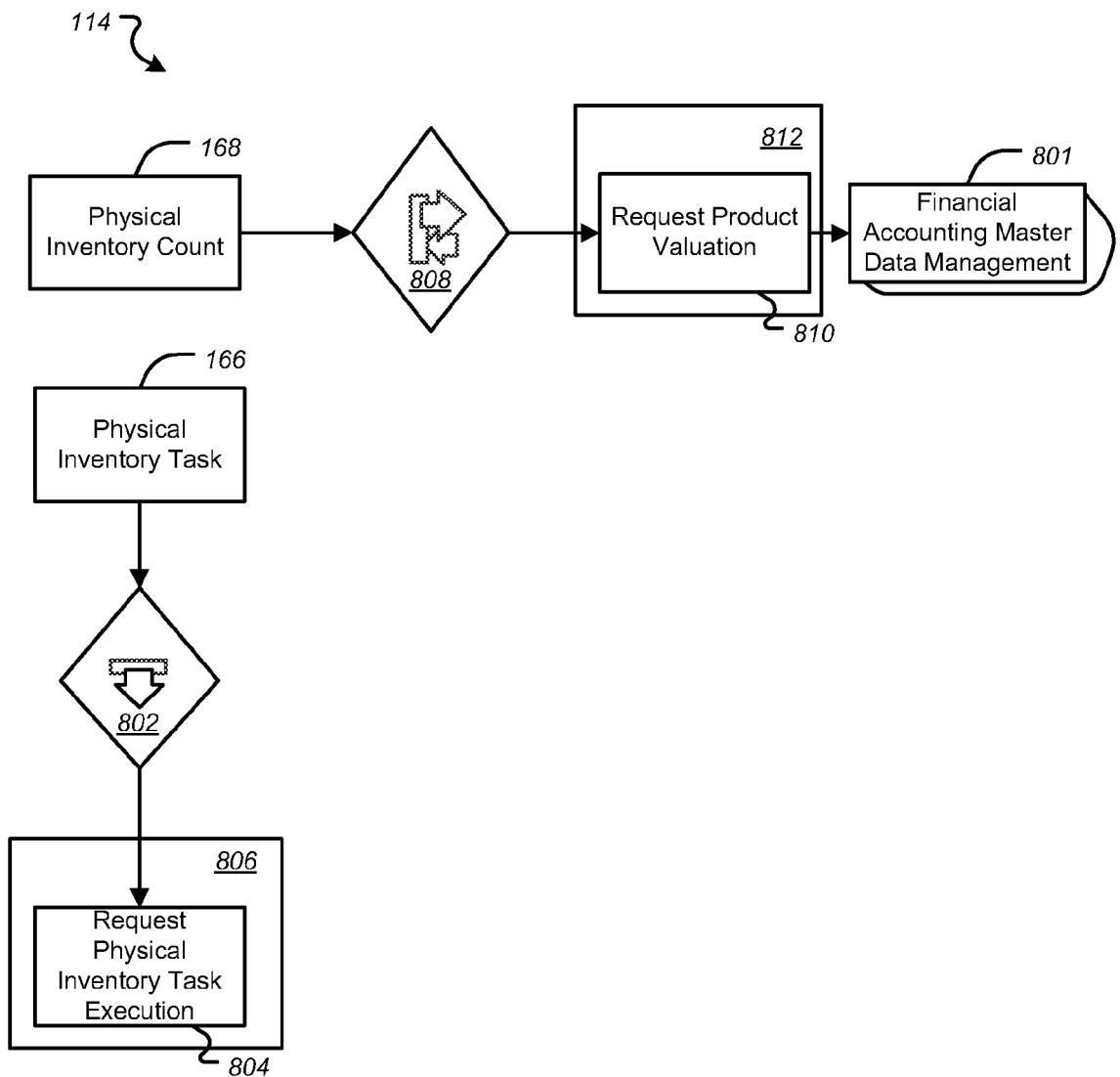
FIG. 8 is a block diagram of a physical inventory processing process component.

The Notify of Inventory Change from Goods and Activity Confirmation to Customer Project Invoice Preparation outbound process agent 738 invokes a Notify of Project Expense operation 742 in a Project Expense Notification Out interface 740. The Notify of Project Expense operation 742 sends a project expense notification to the Customer Project Invoice Preparation process component 744. FIG. 8 is a block diagram of a Physical Inventory Processing process component 114 (FIG. 1A). The Physical Inventory Processing process component 114 manages the process for preparing and executing a physical inventory count, from preparation, through actual counting and gathering of count results, to approval of the results.

A Financial Accounting Master Data Management process component 801, which is external to the process component 114, is included for convenience in describing this process component. The Financial Accounting Master Data Management process component 801 manages financial accounting master data that is used both for accounting and costing purposes. While the external software can be implemented as such a process component, this is not required.

The Physical Inventory Processing process component 114 includes the Physical Inventory Task business object 166 and the Physical Inventory Count business object 168.

The Physical Inventory Task business object 166 is a task for executing a count or count-approval activity within a site. It represents a piece of work to be performed by a person or an automated system. An update to the Physical Inventory Task business object 166 triggers a Request Physical Inventory Task Execution for Output asynchronous outbound process agent 802. The Request Physical Inventory Task Execution for Output outbound process agent 802 invokes a Request Physical Inventory Task Execution operation 804 in a Physical Inventory Task Output Out interface 806 to request an execution of a physical inventory task.

The Physical Inventory Count business object 168 includes instructions on how to execute and approve a physical inventory count of materials and packages. A physical inventory count can include the results of the physical inventory and any differences between this physical inventory and the book inventory. An update in the Physical Inventory Count business object 168 causes a Synchronous Request Product Valuation from Physical Inventory Count to Financial Account synchronous outbound process agent 808 to invoke a Request Production Valuation operation 810 to send a product and resource valuation query to the Financial Accounting Master Data Management process component 801. The operation 810 is included in a Product and Resource Valuation Out interface 812.

Figure 9:
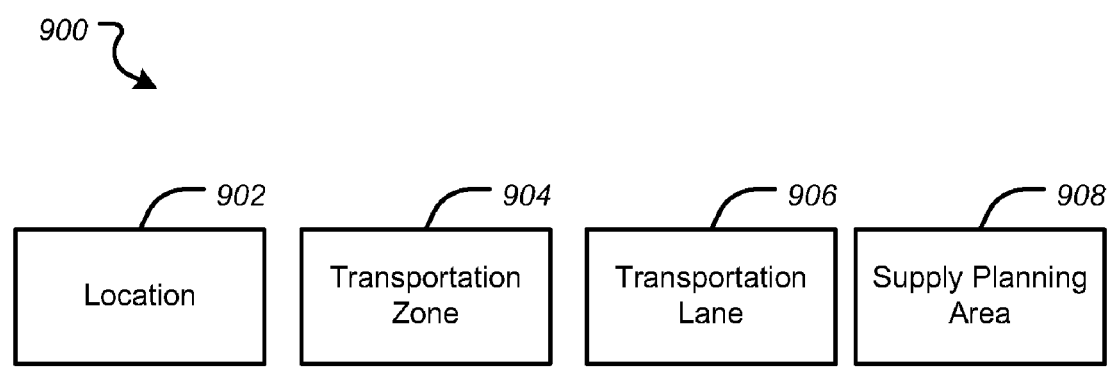
FIG. 9 is a block diagram of a location data management processing process component.

FIG. 9 is a block diagram of the Location Data Management process component 900 (FIG. 1B) of the foundation layer 180. The Location Data Management process component 900 can manage the master data required for physical locations. An example of master data includes the location and objects that depend on the location or group locations.

As shown in FIG. 9, the Location Data Management process component 900 includes the Location business object 902, the Transportation Zone business object 904, the Transportation Lane business object 906, and the Supply Planning Area business object 908. The Location business object 902 represents a geographical place. The Transportation Zone business object 904 represents a zone containing geographical locations that may be considered collectively for modeling or planning transportation routes or transportations. The Transportation Lane business object 906 represents a relationship between two locations or transportation zones that specifies which materials can be transported between the locations or transportation zones, and which means of transport can be used.

The Supply Planning Area business object 908 groups requirements, stocks, and other requirements coverage elements so that they can all be taken into account in a net requirements calculation for supply planning. The goal is to provide a separate allocation of products and to ensure the availability of products on time for a supply planning area. Requirements, stocks and other requirements coverage elements are assigned to exactly one supply planning area. In that way, a systematic and specific supply planning for products within a supply planning area is enabled. In addition, every site can have a supply planning area. Introducing additional supply planning areas helps to separate requirements, stocks and other requirements coverage elements of one site. The creation of additional supply planning areas is necessary only if planning on a site level is not accurate enough. Objects that arrive without a fixed assignment to a supply planning area can be assigned automatically to the supply planning area that represents the site, or rules can be evaluated to assign them to supply planning areas.

Figure 10:
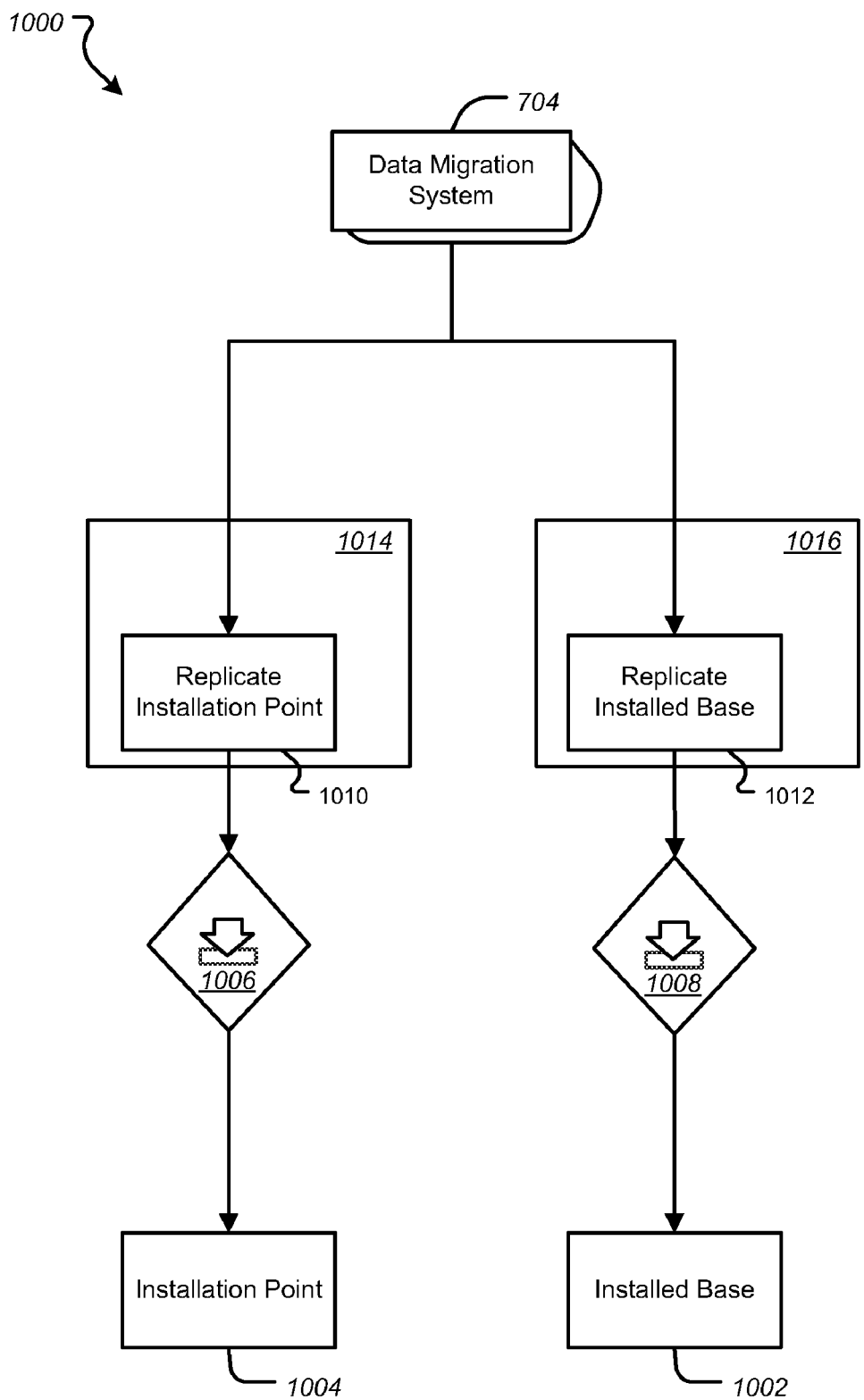
FIG. 10 is a block diagram of an installed base data management process component.

FIG. 10 is a block diagram of the Installed Base Data Processing process component 1000 (FIG. 1B) of the foundation layer 180. The Installed Base Data Processing process component 1000 covers form-based input and output as well as structured file import and export. The form-based input and output can include collaborative input and output via interactive forms. For example, an output management can handle front-end and back-end output. For example, form based-output can have different channels such as print, e-mail, and/or fax. The Data Migration System process component 704 which is external to the process component 1000, is included for convenience in describing this process component. The Installed Base Data Processing process component 1000 includes the Installed Base business object 1002 and the Installation Point business object 1004.

The Installed Base business object 1002 represents a container that holds structured information of business components and their compositions as well as their business features. Installed Base Components carry properties of business objects (e.g., Material or Individual Material), which have been assigned to an Installed Base. The Installed Base business object 1002 can be multi-level structured, be time dependent, and/or include descriptive information about their corresponding business component. Some exemplary content of the Installed Base business object 1002 may be an address and/or application specific extensions.

The Installation Point business object 1004 can describe a physical or logical location at which a business object, for example software or a material, is installed during a certain period of time. An installation point may include descriptive information about its installed object including the quantity of materials used, and further, can be structured in a hierarchical relationship with other installation points.

The Installed Base Data Management process component 1000 uses a Replicate Installation Point operation 1010 included in an Installation Point Replication In interface 1014 to replicate the Installation Point business object 1004. The Replicate Installation Point operation 1010 uses a Replicate Installation Point process agent 1006 to replicate the Installation Point business object 1004. The Installed Base Data Management process component 1000 uses a Replicate Installed Base operation 1012 included in an Installed Base Replication In interface 1016 to replicate the Installed Base business object 1002. The Replicate Installed Base operation 1012 uses a Replicate Installed Base process agent 1008 to replicate the Installed Base business object 1002.

Figure 11:
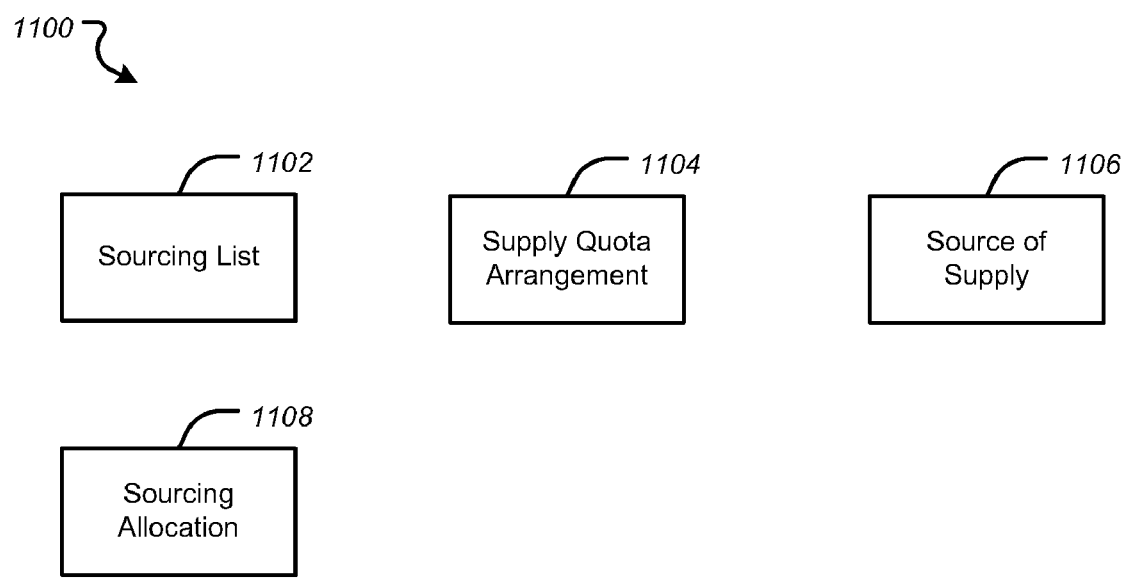
FIG. 11 is a block diagram of a source of supply determination process component.

FIG. 11 is a block diagram of the Source of Supply Determination process component 1100 (FIG. 1B) of the foundation layer 180. The Source of Supply Determination process component 1100 can maintain and access sources of supply and quota arrangements for external and internal procurement processes. The Source of Supply Determination process component 1100 includes the Sourcing List business object 1102, the Supply Quota Arrangement business object 1104, the Source of Supply business object 1106, and the Sourcing Allocation business object 11108.

The Sourcing List business object 1102 represents a sorted list of procurement possibilities. The list can be used for a source of supply determination. The list can include information as to sources of supply, means of transport and supply quota arrangements.

The Supply Quota Arrangement business object 1104 represents a distribution of material requirements or issues to different sources of supply, business partners, or internal organizational unit.

The Source of Supply business object 1106 describes a logical link between a possible source of products and a possible target.

The Sourcing Allocation business object 1108 is an allocation of a product quantity to a source of supply or a supply quota arrangement item that has to be procured or produced.

Figure 12A:
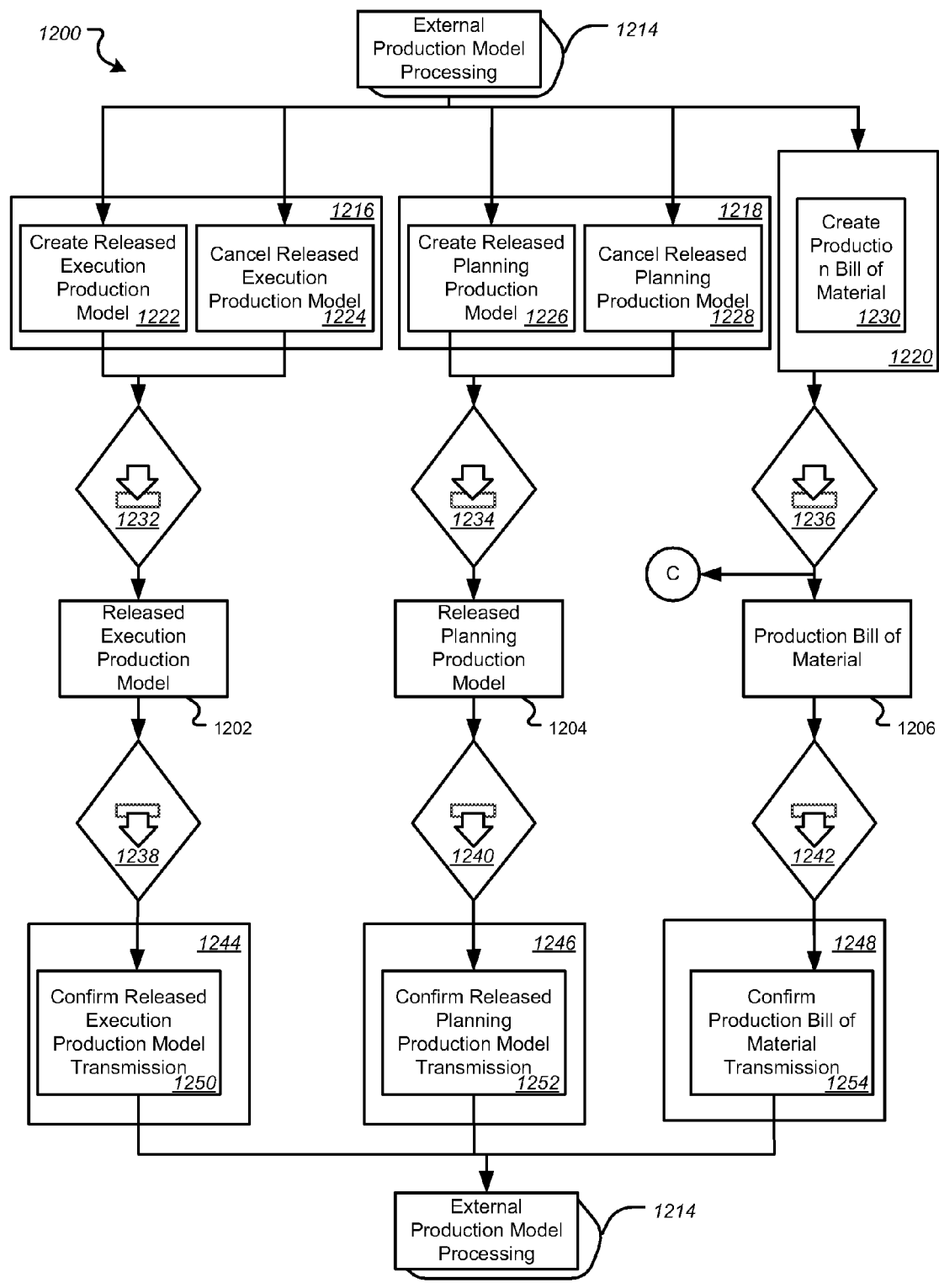
FIGS. 12A and 12B are block diagrams of a production model management process component.
Figure 12B:
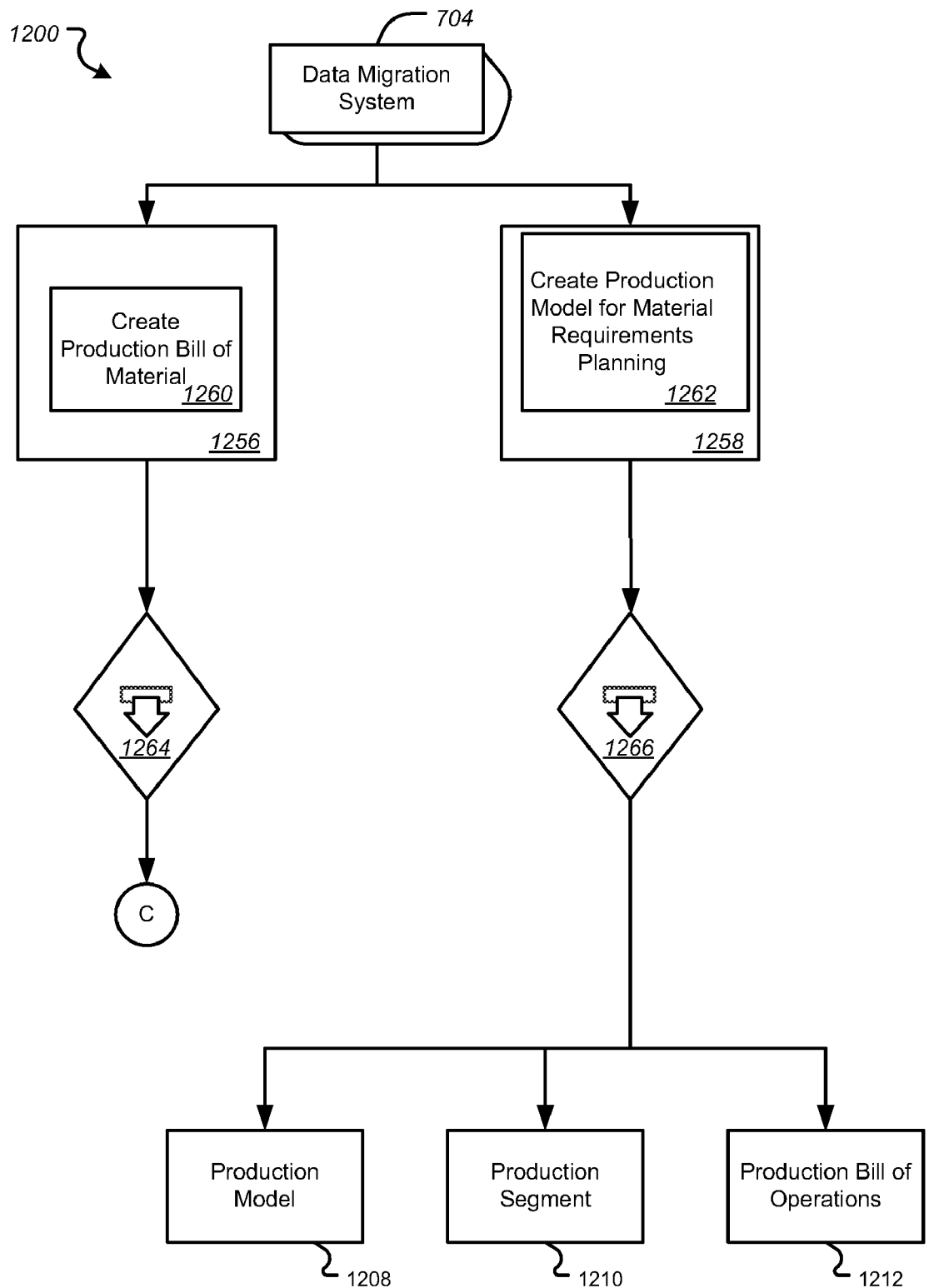

FIGS. 12A and 12B are a block diagram of the Production Model Management process component 1200 (FIG. 1B) of the foundation layer 180. The Production Model Management process component 1200 can maintain and release master data required for production planning and production execution. As shown in FIGS. 12A and 12B, the Production Model Management process component 1200 includes the Released Execution Production Model business object 1202, the Released Planning Production Model business object 1204, the Production Bill of Material business object 1206, the Production Model business object 1208, the Production Segment business object 1210, and the Production Bill of Operations business object 1212. The Production Model Management process component 1200 includes an External Production Model Processing process component 1214, and the Data Migration System process component 704 which are external to the process component 1200, are included for convenience in describing this process component.

The Released Execution Production Model business object 1202 is a released version of a production model that includes production bill of operations and production bill of material data required for the execution of a production process.

The Released Planning Production Model business object 1204 is a released version of a production model that includes the production bill of operations and production bill of material data required for the planning of a production process.

The Production Bill of Material business object 1206 is a complete and structured list that defines and describes the components that are required in the production of a material or family of similar materials.

The Production Model business object 1208 is a released version of a production model that contains all the production bill of operations and production bill of material data required for the planning of a production process.

The Production Segment business object 1210 is a part of a production process in a production center specified by a network of operations and assigned materials for the production of a material.

The Production Bill of Operations business object 1212 is a description of a production process for manufacturing a product. For example, the Production Bill of Operation business object 1212 can include processing or transformation steps that have to be executed. Additionally, the Production Bill of Operation business object 1212 can also specify the resources to be used with technical specifications, such as the standard times, capacity requirements, and work instructions.

As shown in FIG. 12A, the External Production Model Processing process component 1214 creates the Released Execution Production Model business object 1202 using a Create Released Execution Production Model operation 1222 included in a Released Execution Production Model Transmission Received In interface 1216. The Create Released Execution Production Model operation 1222 uses a Maintain Released Execution Production Model inbound process agent 1232 to create the Released Execution Production Model business object 1202. The External Production Model Processing process component 1214 can also cancel the Released Execution Production Model business object 1202 using a Cancel Released Execution Production Model operation 1224 included in the Released Execution Production Model Transmission Received In interface 1216. The Cancel Released Execution Production Model operation 1224 also uses the Maintain Released Execution Production Model inbound process agent 1232 to cancel the Released Execution Production Model business object 1202.

The External Production Model Processing process component 1214 creates the Released Planning Production Model business object 1204 using a Create Released Planning Production Model operation 1226 included in a Released Planning Production Model Transmission Received In interface

1218. The Create Released Planning Production Model operation 1226 uses a Maintain Released Planning Production Model inbound process agent 1234 to create the Released Planning Production Model business object 1204.

The External Production Model Processing process component 1214 can also cancel the Released Planning Production Model business object 1204 using a Cancel Released Planning Production Model operation 1228 included in the Released Planning Production Model Transmission Received In interface 1218. The Cancel Released Planning Production Model operation 1228 also uses the Maintain Released Planning Production Model inbound process agent 1234 to cancel the Released Execution Production Model business object 1204.

The External Production Model Processing process component 1214 creates the Production Bill of Material business object 1206 using a Create Production Bill of Material operation 1230 included in a Production Bill of Material Transmission Received In interface 1220. The Create Production Bill of Material operation 1230 uses a Create Production Bill of Material inbound process agent 1236 to create the Production Bill of Material business object 1206.

An update to the Released Execution Production Model business object 1202 triggers a Confirm Released Execution Production Model Transmission outbound process agent 1238. An update to the Released Planning Production Model business object 1204 triggers a Confirm Released Planning Production Model Transmission outbound process agent 1240. An update to the Production Bill of Material business object 1206 triggers a Confirm Production Bill of Material Transmission outbound process agent 1242.

The Confirm Released Execution Production Model Transmission outbound process agent 1238 invokes a Confirm Released Execution Production Model Transmission operation 1250 in a Released Execution Production Model Transmission Receiving Out interface 1244. The Confirm Released Execution Production Model Transmission operation 1250 confirms its maintenance success to the External Production Model Processing process component 1214.

The Confirm Released Planning Production Model Transmission outbound process agent 1240 invokes a Confirm Released Planning Production Model Transmission operation 1252 in a Released Planning Production Model Transmission Receiving Out interface 1246. The Confirm Released Planning Production Model Transmission operation 1252 confirms its maintenance success to the External Production Model Processing process component 1214.

The Confirm Production Bill of Material Transmission outbound process agent 1242 invokes a Confirm Production Bill of Material Transmission operation 1254 in a Production Bill of Material Transmission Receiving Out interface 1248. The Confirm Production Bill of Material Transmission operation 1254 confirms its creation success to the External Production Model Processing process component 1214.

As shown in FIG. 12B, the Data Migration System process component 704 can also create the Production Bill of Material business object 1206 (FIG. 12A) for migration using a second Create Production Bill of Material operation 1260 included in a Production Bill of Material Migration In interface 1256. The second Create Production Bill of Material operation 1260 uses a Create Production Bill of Material Based on Migration inbound process agent 1264 to create the Production Bill of Material business object 1206 for migration.

The Data Migration System process component 704 can also create the Production Model business object 1208, the Production Segment business object 1210, and the Production Bill of Operations business object 1212 using a Create Production Model for Material Requirements Planning operation 1262 included in a Production Model Migration In interface 1258. The Create Production Model for Material Requirements Planning operation 1262 uses a Create Production Model Based on Migration inbound process agent 1266 to create the Production Model business object 1208, the Production Segment business object 1210, and the Production Bill of Operations business object 1212 for migration.

Figure 13:
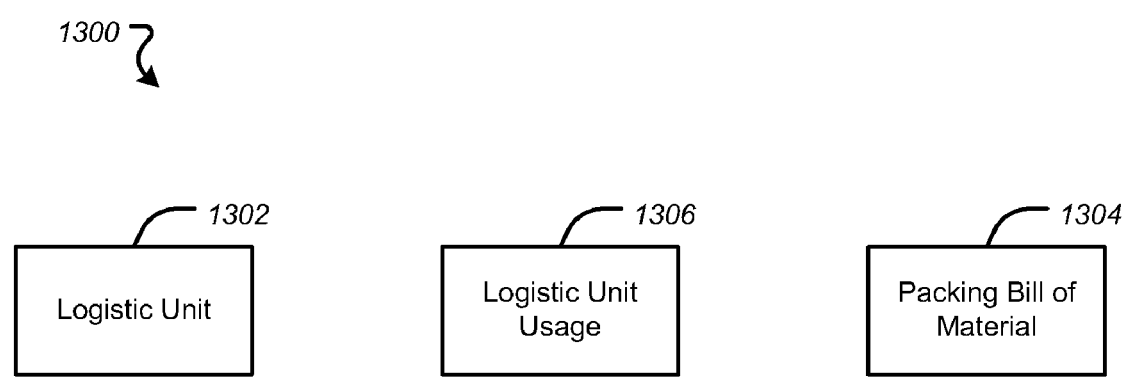
FIG. 13 is a block diagram of a logistic unit data management process component.

FIG. 13 is a block diagram of the Logistic Unit Data Management process component 1300 (FIG. 1B) of the foundation layer 180. The Logistic Unit Data Management process component 1300 can incorporate some or all master data for handling or using logistic units, including grouping and packing instructions. As shown in FIG. 13, the Logistic Unit Data Management process component 1300 includes the Logistic Unit business object 1302, the Packing Bill of Material business object 1304, and the Logistic Unit Usage business object 1306. The Logistic Unit business object 1302 is an item established for logistics operations, such as storage, movement, and packing. For example, the Logistic Unit business object 1302 can represent some or all physical units handled in the same manner during logistic operations, whether they are packed or unpacked goods. The Packing Bill of Material business object 1304 is a complete and structured list of components that defines the packing structure of logistic units. The Logistic Unit Usage business object 1306 is a logistics purpose for which Logistic Units are grouped. The Logistic Unit Usage business object 1306 can represent a process or an activity, such as conveying, packing, or storing.

Figure 14:
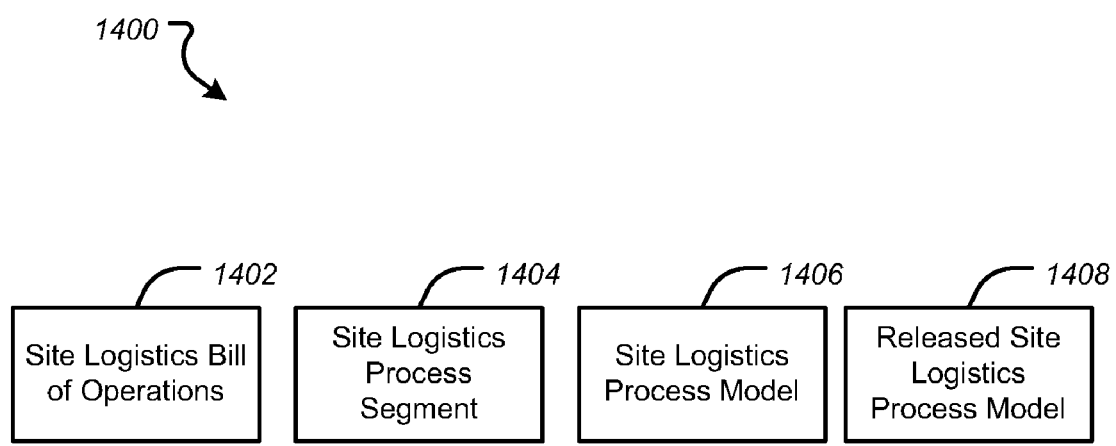
FIG. 14 is a block diagram of a site logistics model management process component.

FIG. 14 is a block diagram of the Site Logistics Model Management process component 1400 (FIG. 1C) of the foundation layer 180. The Site Logistics Model Management process component 1400 can maintain and release master data required for the site logistics execution. As shown in FIG. 14, the Site Logistics Model Management process component 1400 includes the Site Logistics Bill of Operations business object 1402, the Site Logistics Process Segment business object 1404, the Site Logistics Process Model business object 1406, and the Released Site Logistics Process Model business object 1408.

The Site Logistics Bill of Operations business object 1402 is a detailed description of how a product is to be moved, packed and otherwise dealt with during site logistics processing. For example, the Site Logistics Bill of Operations business object 1402 may include operations with attached execution instructions.

The Site Logistics Process Segment business object 1404 is a part of a logistics process specified by a net of operations for packing, moving and checking of goods.

The Site Logistics Process Model business object 1406 is a model of site logistics process that is specified by a sequence of site logistics process segments.

The Released Site Logistics Process Model business object 1408 is a released version of a site logistics process model that includes elements required for defining and describing the execution of a site logistics process.

Figure 15:
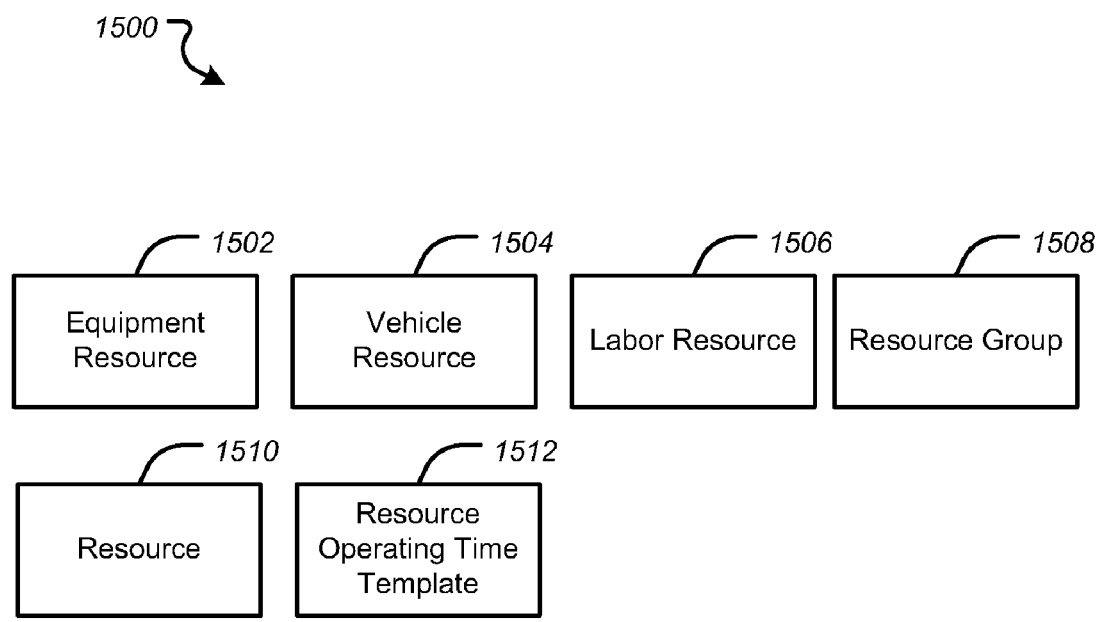
FIG. 15 is a block diagram of a resource data management process component.

FIG. 15 is a block diagram of the Resource Data Management process component 1500 (FIG. 1C) of the foundation layer 180. The Resource Data Management process component 1500 manages the master data required to define a resource. For example, the master data can specify the nature of the resource as well as the capacities and the services that can be provided by the resource. As shown in FIG. 15, the Resource Data Management process component 1500 includes the Equipment Resource business object 1502, the Vehicle Resource business object 1504, the Labor Resource business object 1506, the Resource Group business object 1508, the Resource business object 1510, and the Resource Operating Time Template business object 1512.

The Equipment Resource business object 1502 can be a machine, device, tool, or a group of identical machines, devices, or tools that has the capacity to provide services.

The Vehicle Resource business object 1504 represents a means of transportation or a group of identical means of transportation that provides capacity to perform transportation services. For example, the means of transportation may be indirectly assigned to the vehicle resource (e.g., the capacity of a vehicle resource can be provided by several means of transportation).

The Labor Resource business object 1506 represents an employee or a group of employees with the same skills and qualifications with the capacity to operate specific devices or to perform specific tasks.

The Resource Group business object 1508 represents a grouping of individual resources based on similar physical characteristics, identical functional characteristics, or because of their usage in the same business area.

The Resource business object 1510 represents an asset that contributes to the sourcing, production or delivery of a product.

The Resource Operating Time Template business object 1512 is a template of an operating time definition that contains all information required to maintain the operating times for multiple resources.

Figure 16:
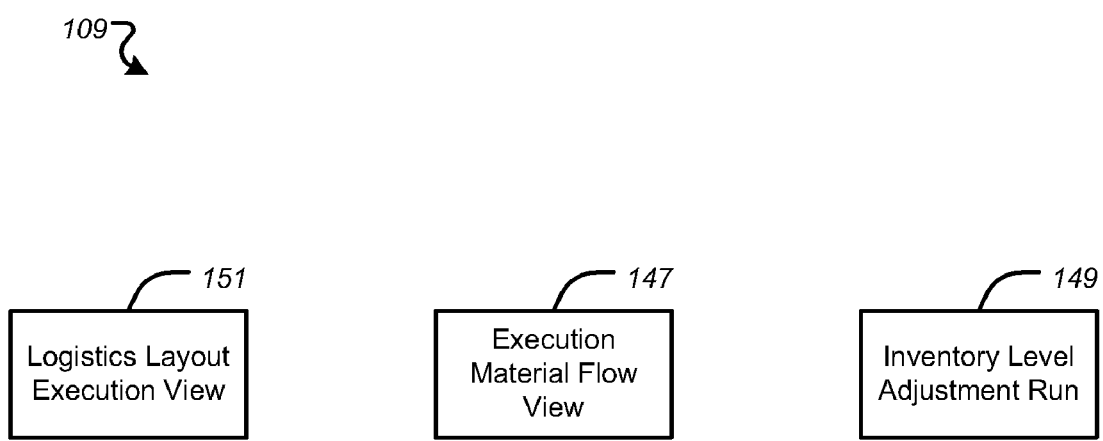
FIG. 16 is a block diagram of a logistics control process component.

FIG. 16 is a block diagram of the Logistics Control process component 109 (FIG. 1A). The Logistics Control process component 109 can optimize inventory levels at logistics areas, taking into consideration material flow, availability, and layout information. As shown in FIG. 16, the Logistics Control process component 109 includes the Execution Material Flow View business object 147, the Inventory Level Adjustment Run business object 149, and the Logistics Layout Execution View business object 151. The Execution Material Flow View business object 147 represents a view on a time-dependent flow of materials, into or out of a certain location or between locations in logistics execution. The Inventory Level Adjustment Run business object 149 represents a specification of an automated run that adjusts the level of inventory for selected storage locations by initiating replenishment or cleanup. The Logistics Layout Execution View business object 151 represents a floor plan of a defined area, within a location, that reflects the spatial arrangement of logistics areas and resources, combined with a time-dependent view of the definable and measurable parameters that are relevant for logistics execution.

Figure 17:
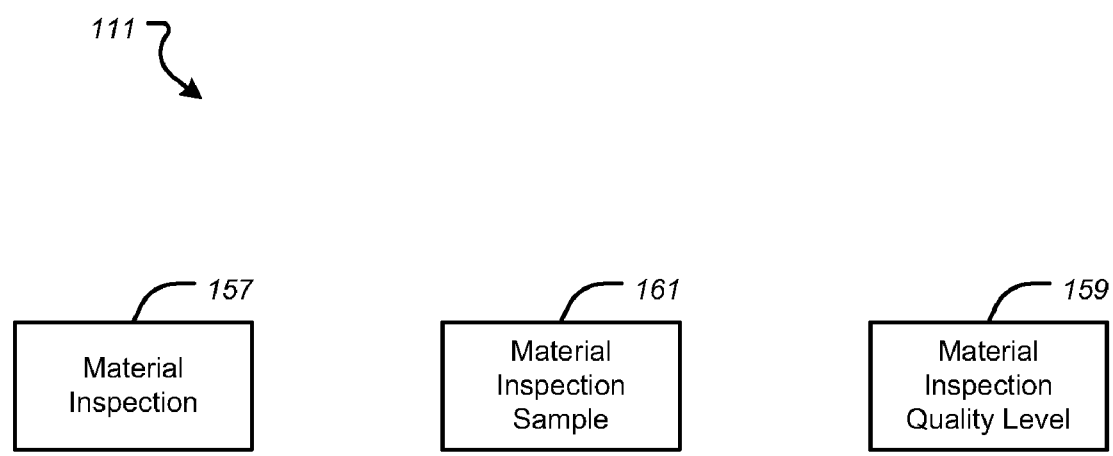
FIG. 17 is a block diagram of a material inspection processing process component.

FIG. 17 is a block diagram of the Material Inspection Processing process component 111 (FIG. 1A). The Material Inspection Processing process component 111 can process quality inspection steps that have to be performed to check whether a material fulfills its specified requirements. The process steps involved include the creation of the inspection, the documentation of the inspection results, and the making of the inspection decision. As shown in FIG. 17, Material Inspection Processing process component 111 includes the Material Inspection business object 157, the Material Inspection Quality Level business object 159, and the Material Inspection Sample business object 161.

The Material Inspection business object 157 represents a document that describes the execution of an inspection for a particular material, and can be used to record this inspection. The Material Inspection Quality Level business object 159 represents the current quality level for an inspection area. This quality level can be determined based on the results of material inspections. The inspection area can consist of any combination of material, vendor, receiving plant, or receiving logistics areas. The Material Inspection Sample business object 161 represents a sample for an examination in the context of a material inspection. The sample is the subject of examination for inspection procedures. A sample can be taken from a material independently of a material inspection and, if necessary, it can later be assigned to a material inspection.

Figure 18:
FIG. 18. is a block diagram of a logistics task management process component.

FIG. 18 is a block diagram of the Logistics Task Management process component 113 (FIG. 1A). The Logistics Task Management process component 113 can group production and site logistics tasks according to business criteria and responsibilities. The aim is to optimize the management and execution of production and site logistics. As shown in FIG. 17, the Logistics Task Management process component 113 includes the Logistics Task Folder business object 165, and the Logistics Task View business object 167.

The Logistics Task Folder business object 165 represents a folder for storing and grouping logistics tasks according to business criteria. The logistics task folder includes details about the processors registered at the folder. The Logistics Task View business object 167 represents a view of logistics tasks providing detailed information to support a worker in selecting and processing a logistics task.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the invention or of what may be claimed, but rather as illustrating preferred embodiments of the invention. Certain features that are described in this specification in the context of separate embodiments, may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A non-transitory computer readable medium including program code for providing message-based services using a service-oriented methodology for implementing an instance of a deployment unit, the medium comprising:

program code for storing a production and site logistics execution deployment unit for the production, assembly, packing, movement and storage of goods, and the execution of logistic processes, where the production and site logistics execution deployment unit defines the limits of an application-defined transaction for the production, assembly, packing, movement and storage of goods, and the execution of logistic processes by a set of actions that have atomicity, consistency, isolation, and durability in a database, and wherein the actions associated with the application-defined transaction are performed by one or more process components contained in the production and site logistics execution deployment unit, wherein each process component comprises a software package realizing a business process and exposing its functionality as one or more service operations, wherein the production and site logistics execution deployment unit comprises:

an inbound delivery processing process component, wherein the inbound delivery processing process component implements the following service operations:

a maintain inbound delivery operation, a notify of received inbound delivery operation, a maintain inbound delivery request operation, a confirm fulfillment operation, a notify of invoicing due operation, and a request customer return execution operation;

an inventory processing process component, wherein the inventory processing process component implements the following service operations:

a notify of inventory change operation, a migrate goods and activity confirmation operation, a notify of inventory change and activity confirmation cancellation operation, a notify of inventory change and activity confirmation operation, a create goods and activity confirmation operation, a cancel goods and activity confirmation operation, a notify of project expense operation, a notify planning of inventory reconciliation operation, and a notify of inventory report operation;

a logistics control process component;
a logistics task management process component;
a material inspection processing process component;
an outbound delivery processing process component, wherein the outbound delivery processing process component implements the following service operations:

an output delivery note operation, a maintain received outbound delivery operation, a notify of outbound delivery operation, a maintain outbound delivery request operation, a confirm fulfillment operation, and a request invoicing operation;

a physical inventory processing process component, wherein the physical inventory processing process component implements the following service operations:

a request physical inventory task execution operation and a request product valuation operation;

a production process component, wherein the production process component implements the following service operations:
a notify of inventory change and activity confirmation cancellation operation, a notify of inventory change and activity confirmation operation, a maintain production request operation, a confirm production request operation, a notify planning of production request confirmation reconciliation operation, a notify of production lot status change operation, a notify of production order operation, and a request production task execution operation; and a site logistics processing process component, wherein the site logistics processing process component implements the following service operations:
a notify of inventory change and activity confirmation cancellation operation, a notify of inventory change and activity confirmation operation, a notify of inventory change operation, a notify planning of site logistics operation, a notify of site logistics reconciliation operation, a maintain site logistics request operation, a notify planning of site logistics request confirmation reconciliation operation, a confirm site logistics request operation, and a request site logistics task execution operation; and wherein the process components of the production and site logistics execution deployment unit are packaged together to be deployed on a single computer system; and program code for executing the application-defined transaction for the production, assembly, packing, movement and storage of goods, and the execution of logistic processes; and program code for presenting data associated with the executed application-defined transaction for the production, assembly, packing, movement and storage of goods, and the execution of logistic processes to a graphical user interface.

2. The non-transitory medium of claim 1, wherein the inbound delivery processing process component comprises an inbound delivery request business object, an inbound delivery business object, and a confirmed inbound delivery business object.

3. The non-transitory medium of claim 1, wherein the inventory processing process component comprises a goods and activity confirmation business object, an identified logistic unit business object, and an inventory business object.

4. The non-transitory medium of claim 1, wherein the logistics control process component comprises an execution material flow view business object, an inventory level adjustment run business object, and a logistics layout execution view business object.

5. The non-transitory medium of claim 1, wherein the logistics task management process component comprises a logistics task folder business object and a logistics task view business object.

6. The non-transitory medium of claim 1, wherein the material inspection processing process component comprises a material inspection business object, a material inspection quality level business object, and a material inspection sample business object.

7. The non-transitory medium of claim 1, wherein the outbound delivery processing process component comprises an outbound delivery request business object, an outbound delivery business object, and a confirmed outbound delivery business object.

8. The non-transitory medium of claim 1, wherein the physical inventory processing process component comprises a physical inventory task business object and a physical inventory count business object.

9. The non-transitory medium of claim 1, wherein the production process component comprises a production request business object, a production order business object, a production lot business object, a production task business object, a production confirmation business object, a production execution task view business object, a production lot closure run business object, a production order creation run business object, and a production order release run business object.

10. The non-transitory medium of claim 1, wherein the site logistics processing process component comprises a site logistics request business object, a site logistics order business object, a site logistics task business object, a site logistics confirmation business object, a site logistics lot business object, and a site logistics execution task view business object.

11. The non-transitory medium of claim 1, wherein the services operations associated with the inbound delivery processing process component are grouped into service interfaces, the service interfaces comprising:
a delivery notification in interface that includes the maintain inbound delivery operation;
a delivery notification out interface that includes the notify of received inbound delivery operation;
a fulfillment in interface that includes the maintain inbound delivery request operation;
a fulfillment out interface that includes the confirm fulfillment operation;
an invoice verification out interface that includes the notify of invoicing due operation; and
a request customer return execution out interface that includes the request customer return execution operation.

12. The non-transitory medium of claim 1, wherein the services operations associated with the inventory processing process component are grouped into service interfaces, the service interfaces comprising:
a project expense notification out interface that includes the notify of project expense operation;
a goods and activity confirmation migration in interface that includes the migrate goods and activity confirmation operation;
an inventory and activity accounting out interface that includes the notify of inventory change and activity confirmation cancellation and notify of inventory change operation and the activity confirmation operation;
an inventory changing in interface that includes the create goods and activity confirmation operation and the cancel goods and activity confirmation operation;
an inventory changing out interface that includes the notify of inventory change operation;
an inventory reconciliation out interface that includes the notify planning of inventory reconciliation operation; and
an inventory report accounting out interface that includes the notify of inventory report operation.

13. The non-transitory medium of claim 1, wherein the services operations associated with the outbound delivery processing process component are grouped into service interfaces, the service interfaces comprising:

a delivery note out interface that includes the output delivery note operation;

a delivery notification in interface that includes the maintain received outbound delivery operation;

a delivery notification out interface that includes the notify of outbound delivery operation;

a fulfillment in interface that includes the maintain outbound delivery request operation;

a fulfillment out interface that includes the confirm fulfillment operation; and a request invoicing out interface that includes the request invoicing operation.

14. The non-transitory medium of claim 1, wherein the services operations associated with the physical inventory processing process component are grouped into service interfaces, the service interfaces comprising:

a physical inventory task output out interface that includes the request physical inventory task execution operation; and a product and resource valuation out interface that includes the request product valuation operation.

15. The non-transitory medium of claim 1, wherein the services operations associated with the production process component are grouped into service interfaces, the service interfaces comprising:

an inventory and activity accounting out interface that includes the notify of inventory change operation and the activity confirmation cancellation and notify of inventory change and activity confirmation operation;

a producing in interface that includes the maintain production request operation;

a producing out interface that includes the confirm production request operation and the notify planning of production request confirmation reconciliation operation;

a production accounting out interface that includes the notify of production lot status change operation;

a production order output out interface that includes the notify of production order operation; and a production task output out interface that includes the request production task execution operation.

16. The non-transitory medium of claim 1, wherein the services operations associated with the site logistics processing process component are grouped into service interfaces, the service interfaces comprising:

an inventory and activity accounting out interface that includes the notify of inventory change operation and the activity confirmation cancellation and notify of inventory change and activity confirmation operation;

an inventory changing out interface that includes the notify of inventory change operation;

a site logistics notification out interface that includes the notify planning of site logistics operation and the notify of site logistics reconciliation operation;

a site logistics processing in interface that includes the maintain site logistics request operation;

a site logistics processing out interface that includes the notify planning of site logistics request confirmation reconciliation operation and the confirm site logistics request operations; and a site logistics task output out interface that includes the request site logistics task execution operation.

17. The non-transitory medium of claim 1, wherein the single computer system comprises a single physical hardware platform.

* * * * *